(12) United States Patent
Kozuka et al.

(10) Patent No.: US 10,726,315 B2
(45) Date of Patent: Jul. 28, 2020

(54) IMAGE PROCESSING DEVICE, IMAGE PROCESSING METHOD, AND PROGRAM

(71) Applicant: Panasonic Intellectual Property Management Co., Ltd., Osaka (JP)

(72) Inventors: Masayuki Kozuka, Osaka (JP); Yoshiichiro Kashiwagi, Kyoto (JP); Masaya Yamamoto, Kyoto (JP); Yasushi Uesaka, Hyogo (JP); Yoshihiro Mori, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/348,026

(22) PCT Filed: Nov. 13, 2017

(86) PCT No.: PCT/JP2017/040732
§ 371 (c)(1),
(2) Date: May 7, 2019

(87) PCT Pub. No.: WO2018/092711
PCT Pub. Date: May 24, 2018

(65) Prior Publication Data
US 2019/0303733 A1    Oct. 3, 2019

Related U.S. Application Data

(60) Provisional application No. 62/423,335, filed on Nov. 17, 2016.

(30) Foreign Application Priority Data

Aug. 30, 2017 (JP) .................................. 2017-164937

(51) Int. Cl.
*G06K 15/02* (2006.01)
*G06T 5/00* (2006.01)
(Continued)

(52) U.S. Cl.
CPC ............ *G06K 15/1878* (2013.01); *G06T 5/00* (2013.01); *G06T 5/007* (2013.01); *G06T 5/009* (2013.01);
(Continued)

(58) Field of Classification Search
CPC .. G06K 15/1878; H04N 5/232; H04N 1/6058; H04N 5/235; H04N 1/6097;
(Continued)

(56) References Cited

U.S. PATENT DOCUMENTS

2008/0225313 A1    9/2008 Imai
2008/0291498 A1    11/2008 Yano et al.
(Continued)

FOREIGN PATENT DOCUMENTS

CN    101312485 A    11/2008
JP    2006-080834    3/2006
(Continued)

OTHER PUBLICATIONS

The Extended European Search Report dated Oct. 16, 2019 for the related European Patent Application No. 17871075.2.
(Continued)

*Primary Examiner* — Mekonnen D Dagnew
(74) *Attorney, Agent, or Firm* — McDermott Will & Emery LLP

(57) ABSTRACT

An image processing device includes an acquisition section configured to acquire first still image data obtained through imaging and having a brightness range defined in a first dynamic range and performance information indicating a printing performance of a printing device, a converter con-
(Continued)

figured to convert the first still image data acquired by the acquisition section into second still image data defined in a second dynamic range having a smaller brightness range than the brightness range of the first dynamic range depending on the printing performance indicated by the performance information acquired by the acquisition section, and an output section configured to output the second still image data converted by the converter to the printing device.

11 Claims, 28 Drawing Sheets

(51) Int. Cl.
*H04N 1/407* (2006.01)
*H04N 1/46* (2006.01)
*H04N 5/355* (2011.01)
*H04N 5/232* (2006.01)
*G06T 7/90* (2017.01)
*H04N 1/60* (2006.01)
*H04N 5/235* (2006.01)

(52) U.S. Cl.
CPC ............... *G06T 7/90* (2017.01); *H04N 1/407* (2013.01); *H04N 1/46* (2013.01); *H04N 1/6058* (2013.01); *H04N 1/6097* (2013.01); *H04N 5/232* (2013.01); *H04N 5/235* (2013.01); *H04N 5/35536* (2013.01)

(58) Field of Classification Search
CPC ...... H04N 1/407; H04N 1/46; H04N 5/35536; G06T 7/90; G06T 5/00; G06T 5/009; G06T 5/007
See application file for complete search history.

(56) References Cited

U.S. PATENT DOCUMENTS

| | | | |
|---|---|---|---|
| 2009/0116082 A1* | 5/2009 | Osa | H04N 1/6011 358/501 |
| 2014/0043628 A1 | 2/2014 | Kishino et al. | |
| 2016/0205338 A1 | 7/2016 | Kozuka et al. | |
| 2016/0227092 A1 | 8/2016 | Ikeda | |
| 2019/0246087 A1* | 8/2019 | Uesaka | G06T 5/007 |
| 2020/0029096 A1* | 1/2020 | Rusanovskyy | H04N 19/587 |
| 2020/0077012 A1* | 3/2020 | Miyai | H04N 5/2256 |

FOREIGN PATENT DOCUMENTS

| | | |
|---|---|---|
| JP | 2014-053886 | 3/2014 |
| JP | 2015-056807 | 3/2015 |

OTHER PUBLICATIONS

International Search Report of PCT application No. PCT/JP2017/040732 dated Feb. 6, 2018.
English Translation of Chinese Search Report dated Apr. 3, 2020 for the related Chinese Patent Application No. 201780070657.7.

* cited by examiner

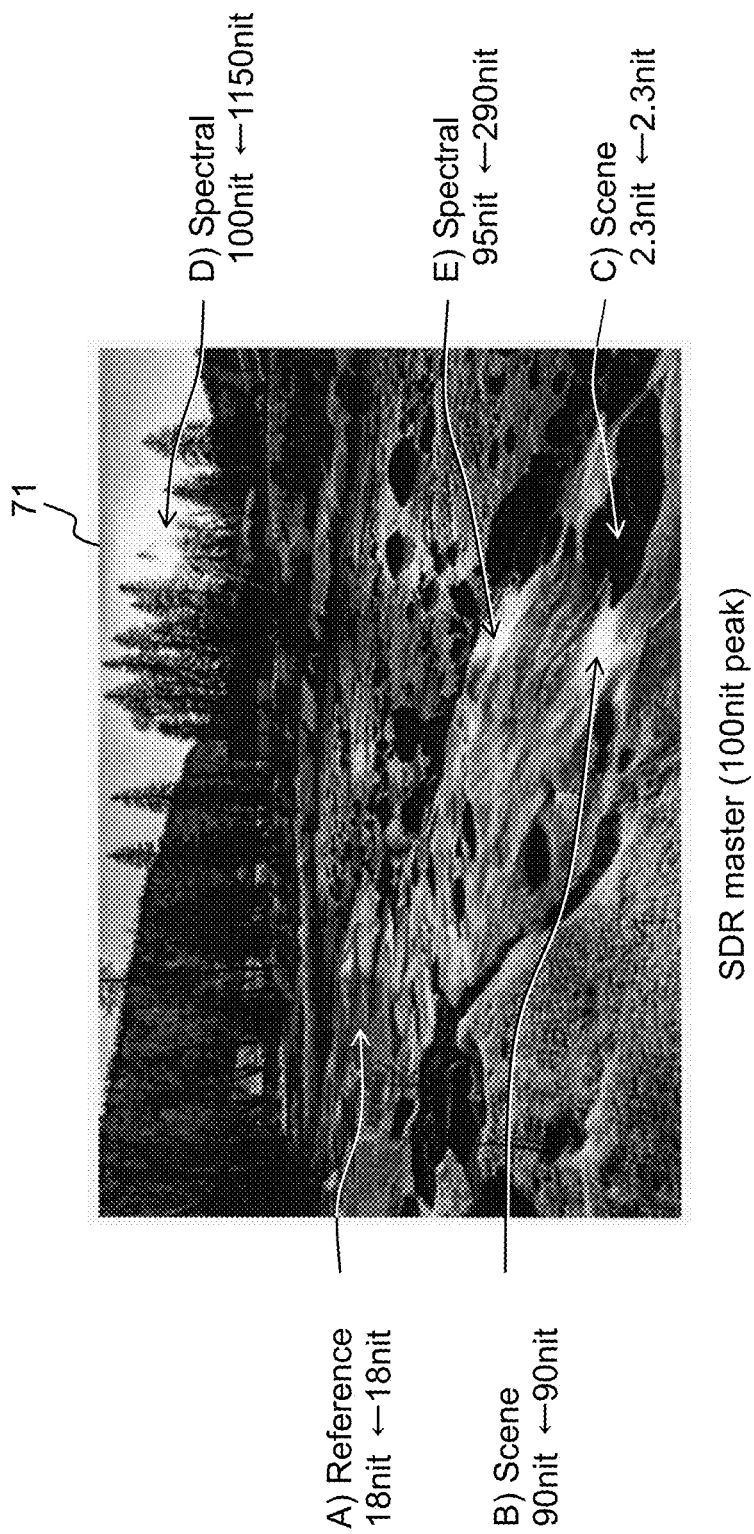

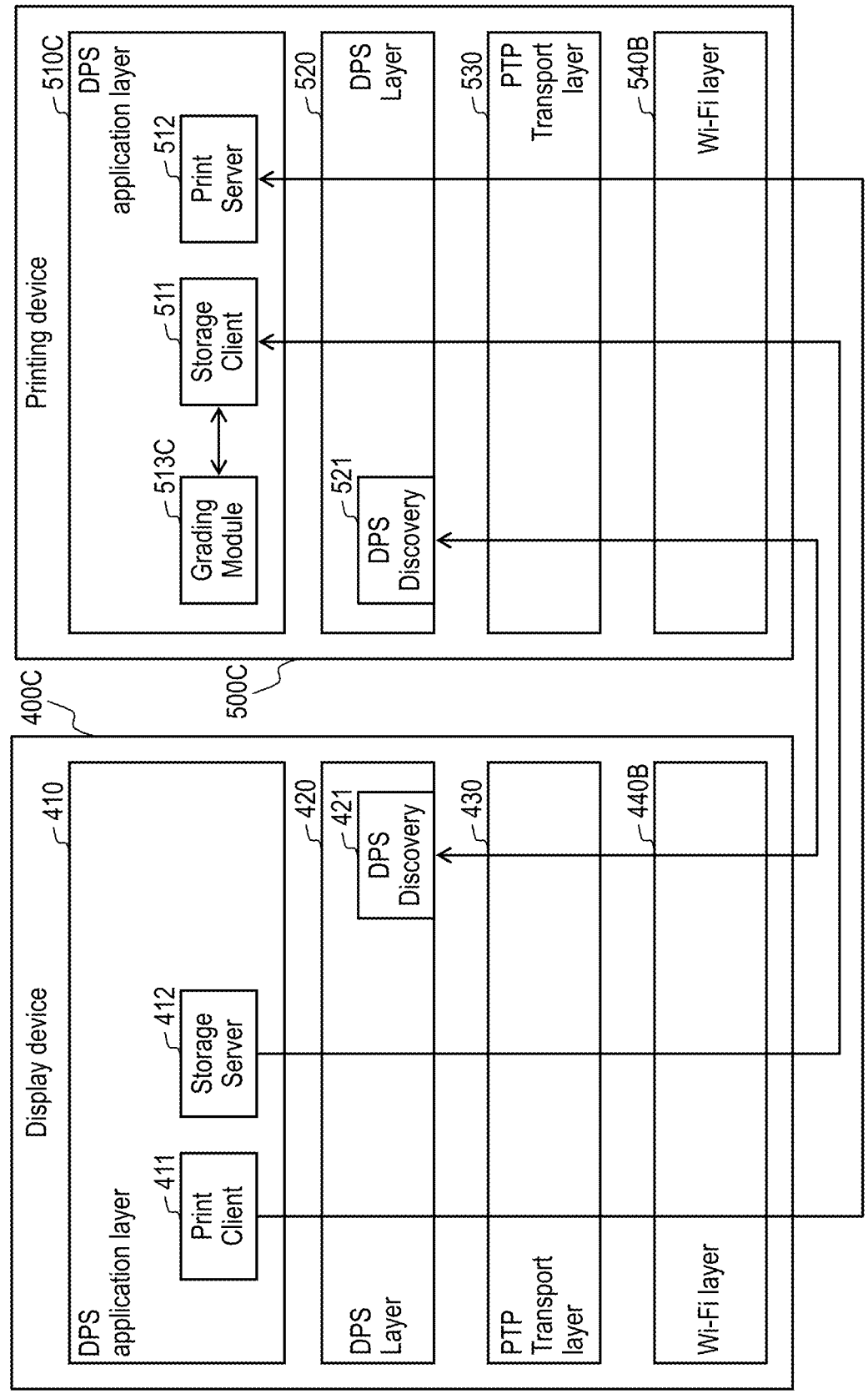

IMAGE PROCESSING DEVICE, IMAGE PROCESSING METHOD, AND PROGRAM

CROSS-REFERENCE TO RELATED APPLICATIONS

This application is a U.S. national stage application of the PCT International Application No. PCT/JP2017/040732 filed on Nov. 13, 2017, which claims the benefit of foreign priority of Japanese patent application No. 2017-164937 filed on Aug. 30, 2017 and the benefit of priority of U.S. provisional patent application No. 62/423,335 filed on Nov. 17, 2016, the contents all of which are incorporated herein by reference.

TECHNICAL FIELD

The present disclosure relates to an image processing device and image processing method.

BACKGROUND ART

PTL 1 discloses an imaging device configured to record High Dynamic Range (HDR) still image with a wide dynamic range by synthesizing a plurality of images different in exposure.

CITATION LIST

Patent Literature

PTL 1: Unexamined Japanese Patent Publication No. 2015-056807

SUMMARY

With the technology disclosed in PTL 1, it is difficult to obtain still image data for printing high-quality printed matters.

The present disclosure provides an image processing device and an image processing method that provide still image data for printing high-quality printed matter.

An image processing device of the present disclosure includes: an acquisition section configured to acquire first still image data obtained through imaging and having a brightness range defined in a first dynamic range and performance information indicating a printing performance of a printing device; a converter configured to convert the first still image data acquired by the acquisition section to second still image data defined in a second dynamic range having a smaller brightness range than the first dynamic range depending on the printing performance indicated by the performance information acquired by the acquisition section, and an output section configured to output the second still image data converted by the converter to the printing device.

An image processing method of the present disclosure includes: acquiring first still image data obtained through imaging and having a brightness range defined in a first dynamic range and performance information indicating a printing performance of a printing device; converting the first still image data acquired to second still image data defined in a second dynamic range having a smaller brightness range than the first dynamic range depending on the printing performance indicated by the performance information acquired; and outputting the second still image data converted to the printing device.

General or specific aspects of these devices can be implemented by a system, a method, an integrated circuit, a computer program, or a recording medium such as a computer-readable CD-ROM. The aspects can alternatively be implemented through any appropriate combination among the system, the method, the integrated circuit, the computer program, and the recording medium.

The image processing device and an image processing method of the present disclosure provide still image data for printing high-quality printed matter.

BRIEF DESCRIPTION OF DRAWINGS

FIG. 7A is a drawing illustrating an exemplary brightness obtained as a result of mastering an original image illustrated in FIG. 6 to an SDR image.

FIG. 26 is a drawing schematically illustrating a fourth example of the communication protocol between the display device and the printing device in the exemplary embodiment.

DESCRIPTION OF EMBODIMENTS

Object of the Present Disclosure

The present disclosure provides a High Dynamic Range (HDR) still image having a new value for user and a new photographing culture, in accordance with two techniques of an HDR display technique and an HDR imaging technique. The new value for user relates to generation of still image data enhanced in realistic sensation and reduced in blown-out highlights (gradation defectiveness in a light region, also referred to as crushed shadow highlights), crushed shadows (gradation defectiveness in a dark region), and the like. The new photographing culture relates to appreciation of an HDR still image obtained through imaging with a camera adaptive to imaging of an HDR still image and displayed on a display device adaptive to HDR display (hereinafter, referred to as "HDR display device"). Examples of the HDR display device include HDR television sets (HDRTV), tablet terminals adaptive to HDR, smartphones adaptive to HDR, personal computers (PC) adaptive to HDR, and displays adaptive to HDR. The HDR still image is also called an HDR picture.

The present disclosure provides an image processing device and an image processing method achieving generation of still image data that can be displayed or printed also by a display device adaptive to SDR display but nonadaptive to HDR display (hereinafter, referred to as "SDR display device") and a printing device adaptive to SDR still image printing but nonadaptive to HDR still image printing (hereinafter, referred to as "SDR printing device"). Specifically, the present disclosure provides an image processing device and an image processing method achieving improved convenience of HDR still image data by provision of still image data that can be reproduced as an HDR still image, to a device adaptive to HDR still image processing as well as a device adaptive to SDR still image processing but nonadaptive to HDR still image processing. Reproduction of an HDR still image in the present disclosure includes displaying the HDR still image and printing by processing the HDR still image. In other words, reproduction includes displaying and printing in the present disclosure.

Background of HDR Display Technique

Figure 1:
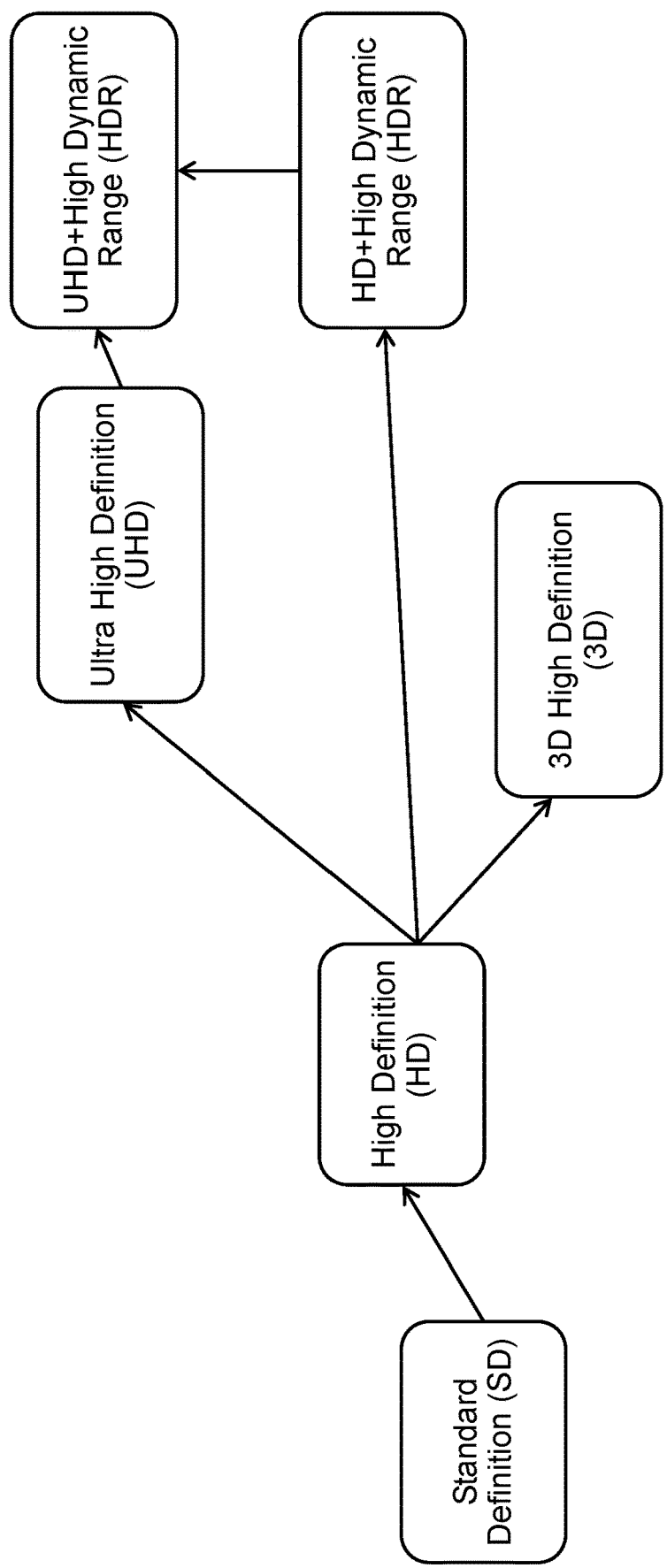
FIG. 1 is a schematic view for explaining progress of imaging technique.

FIG. 1 is a schematic drawing for explaining progress of imaging technique.

Video quality improvement has mainly been achieved by increase in the number of display pixels. High definition (HD) video having 1920×1080 pixels has been spread in place of conventional standard definition (SD) video having 720×480 pixels.

Ultra-high definition (UHD) video having 3840×2160 pixels or video having further increased 4096×2160 pixels (so-called 4K video) has recently been proposed for further video quality improvement. There have also been considered, along with such 4K video, brightness range (hereinafter, referred to also as "dynamic range") extension, color gamut extension, increase of frame rates, and the like.

With regard to the dynamic range, a high dynamic range (HDR) is proposed as a system achieving representation of light rays such as specular reflected light difficult to be represented with current television signals, with more realistic lightness, while maintaining gradation in the dark area. Conventional television signals have been categorized in a Standard Dynamic Range (SDR) having highest brightness of 100 nit. In contrast, HDR has the highest brightness possibly enhanced to more than or equal to 1000 nit. Standardization for mastering displays has also been in progress in the Society of Motion Picture and Television Engineers (SMPTE), the International Telecommunication Union-Radiocommunication Sector (ITU-R), and the like. Specific examples of HDR application targets include, similarly to HD and UHD, broadcasting, package media (e.g. Blu-ray (Registered Trademark) discs), and internet distribution.

HDR Display Technique

Figure 2:
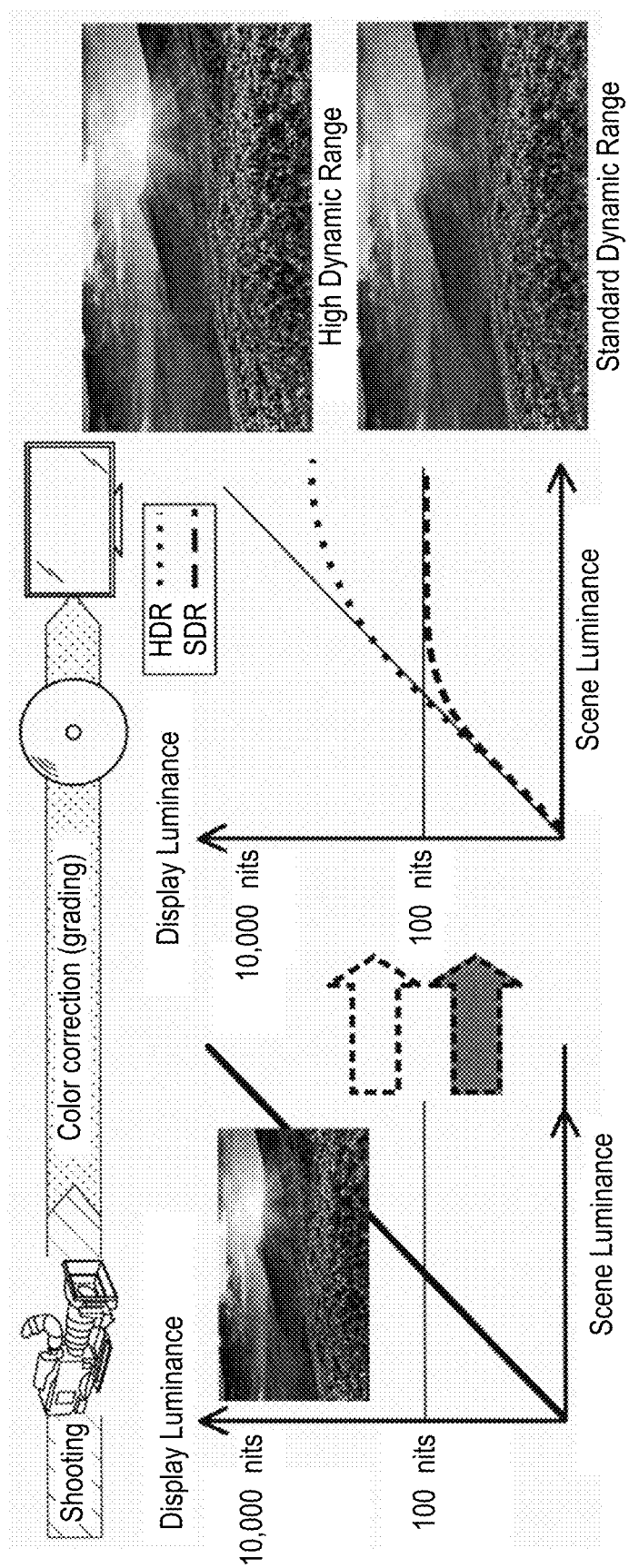
FIG. 2 is a schematic view for explaining an HDR display technique.

FIG. 2 is a schematic view for explaining an HDR display technique.

HDR is not a system achieving a television sets of simply quite high lightness. HDR is a system having a video brightness range (dynamic range) extended to 0 nit to 10,000 nit defined by ST2084 in Society of Motion Picture and Television Engineers (SMPTE) from 0.1 nit to 100 nit defined by a standard of Broadcasting Service (Television) 709 (BT.709) exemplifying SDR, to enable representation of images of high brightness such as the shine sun, the sky, reflection of light rays, and the like having been unsuccessfully represented before, and enable simultaneous recording of a light portion and a dark portion. As used herein the term "brightness" herein is optical brightness and means physical quantity indicative of lightness of a light source. HDR includes two systems, namely, ST 2084 suitable for video (packaged video) to be graded (processed for adjustment of colors and tones of the video) subsequent to imaging, video for Internet Protocol (IP) distribution, and the like, and Hybrid Log Gamma (HLG system) suitable for video for live broadcasting, video imaged by users, and the like.

In this manner, the HDR display technique includes the HLG system achieving compatibility between SDR and HDR, and a PQ system having no simple display compatibility between SDR and HDR. Note that the PQ system is also referred to as HDR10 system.

Figure 3A:
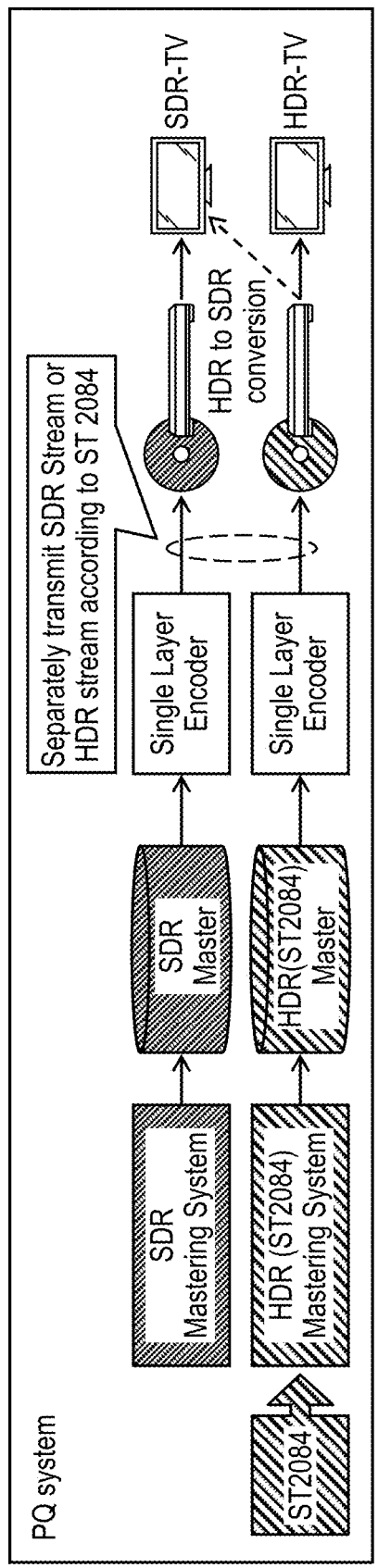
FIG. 3A is a schematic view for explaining a Perceptual Quantization (PQ) system.
Figure 3B:
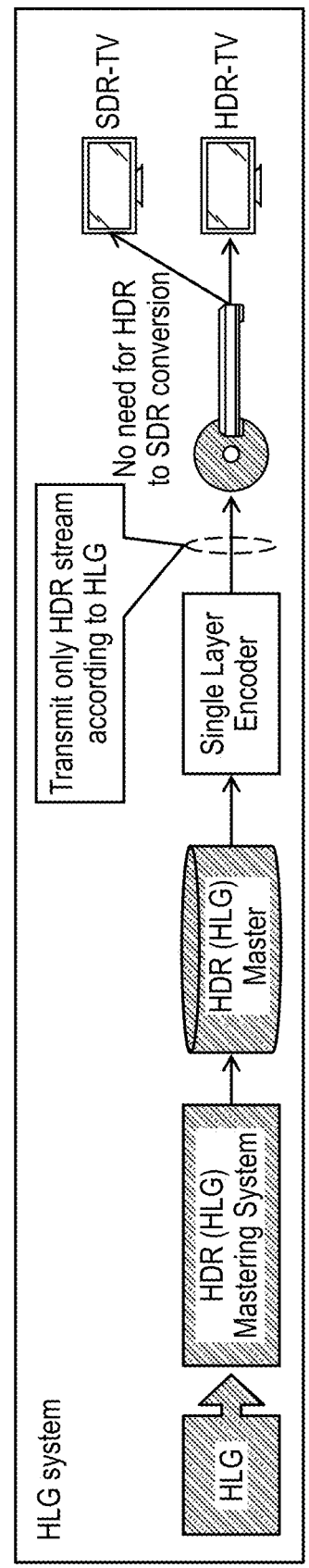
FIG. 3B is a schematic view for explaining a Hybrid Log Gamma (HLG) system.

FIG. 3A is a schematic view for explaining the PQ system. FIG. 3B is a schematic view of the HLG system.

As illustrated in FIG. 3A, PQ system is a system achieving no compatibility between SDR and HDR. SDR and HDR are graded separately and transmitted separately in this system. This system requires SDR conversion of converting HDR video data to SDR video data in order to display video reproduced in accordance with Ultra HD Blu-ray (Registered Trademark) on an SDRTV (a television sets adaptive to SDR but nonadaptive to HDR).

As illustrated in FIG. 3B, 2100 Hybrid Log Gamma (HLG) of the ITU Radiocommunication Sector (ITU-R) is a system having compatibility between SDR and HDR. In this system, grading for HLG is performed, and only a stream for HLG is transmitted. The stream for HLG has compatibility with SDR. HDR video data can thus be displayed on an SDRTV without need for SDR conversion for converting from the HDR video data to SDR video data.

Figure 4:
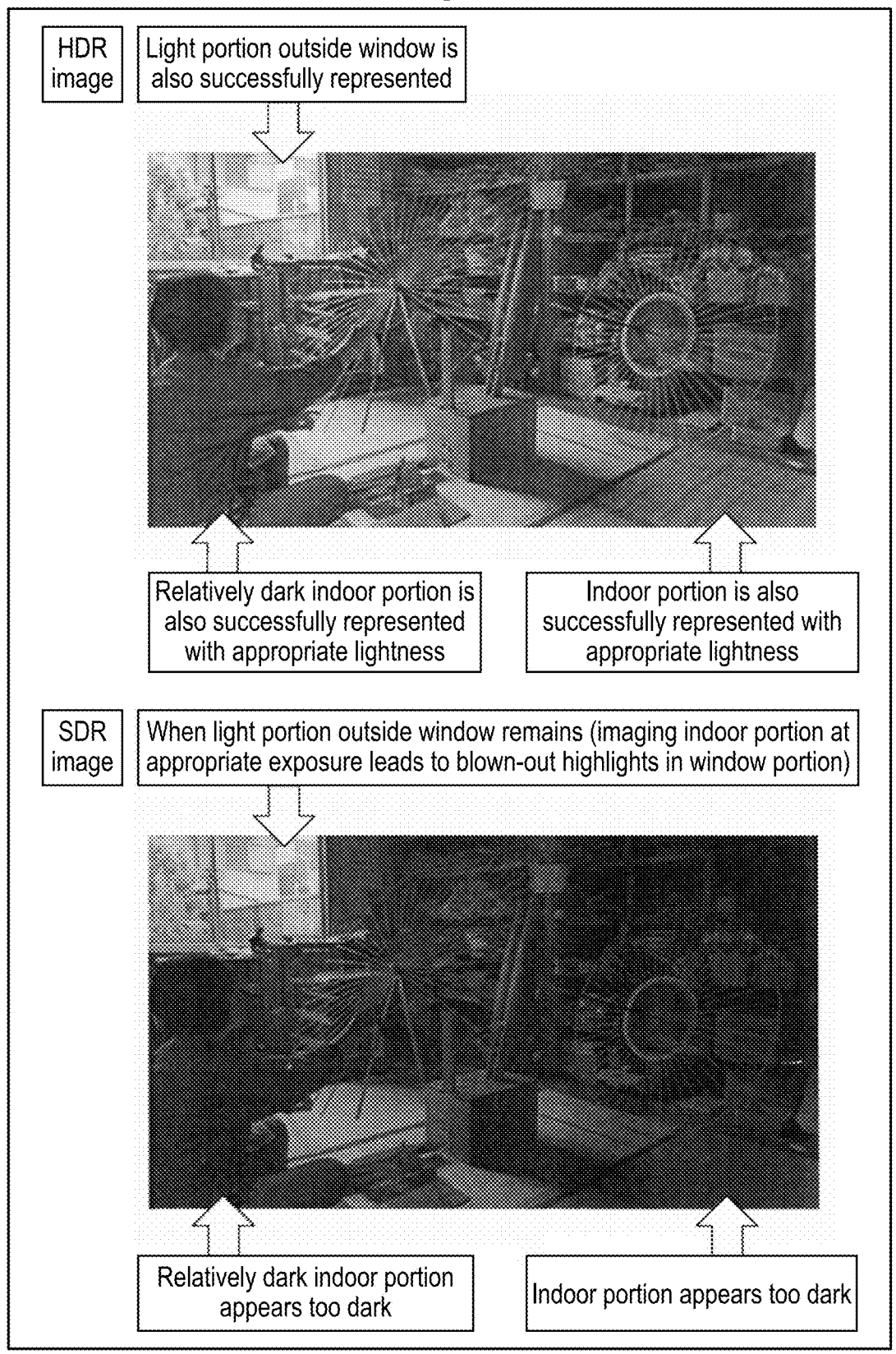
FIG. 4 illustrates an exemplary HDR image adaptive to HDR compared with an exemplary Standard Dynamic Range (SDR) image adaptive to SDR.

FIG. 4 illustrates an exemplary HDR image adaptive to HDR compared with an exemplary SDR image adaptive to SDR. FIG. 4 illustrates an HDR image and an SDR image of a single picture having comparatively large difference between lightness and darkness and including a relatively dark indoor portion and a relatively light portion outside a window.

An HDR image is an image obtained by reproducing HDR still image data or HDR moving image data. An SDR image is an image obtained by reproducing SDR still image data or SDR moving image data. As exemplified in an upper part in FIG. 4, both the relatively light portion outside the window and the relatively dark indoor portion in the HDR image are each represented in appropriate lightness. In contrast, as exemplified in a lower part in FIG. 4, the SDR image has exposure adjusted for representation of the relatively light portion outside the window, so that the relatively dark indoor portion is too dark and has partial crushed shadows to result in poor appearance. If the exposure is adjusted for appropriate representation of the indoor portion, the portion outside the window will become too light and have partial blown-out highlights to result in poor appearance (not illustrated). The HDR image thus achieves appropriate gradation and reduction of both blown-out highlights and crushed shadows in such a single picture having comparatively large difference between lightness and darkness and including a relatively light portion and a relatively dark portion, and being difficult to be represented in an SDR image.

Figure 5:
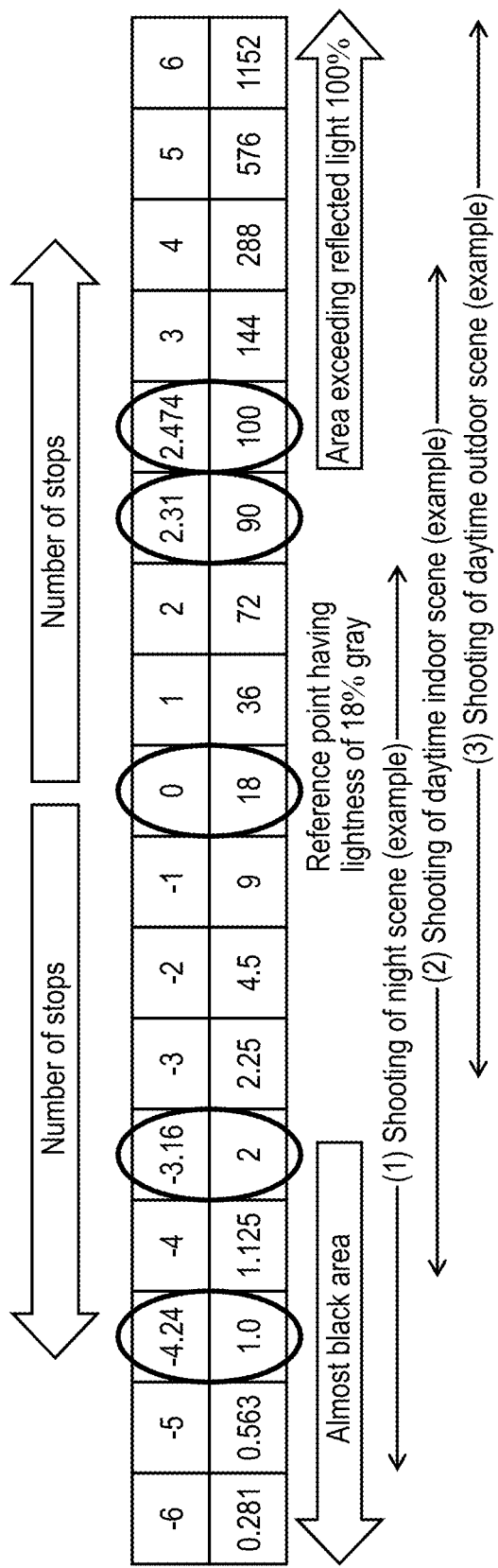
FIG. 5 is a drawing illustrating an exemplary scale of brightness at the time of imaging.

FIG. 5 is a drawing illustrating an exemplary scale of brightness at the time of imaging.

In taking an image of a subject with a camera, typically, 18% gray having a reflectance ratio of 18% is a reference point of lightness as illustrated in FIG. 5. "18% gray" is the reference reflectance ratio that is a standard for lightness. The number of stops illustrated in FIG. 5 represents relative brightness. The brightness at 18% gray is determined as a reference point, and the number of stops at the reference point is determined to be zero. The number of stops is defined to increment by 1 each time the brightness becomes double, and decrement by 1 each time the brightness becomes half.

In taking an image of a subject with a camera, the brightness obtained from an image sensor of the camera (for example, complementary Metal-Oxide Semiconductor (CMOS) or Charge Coupled Device (CCD)) varies with exposure determined by aperture, shutter speed, sensitivity setting, and the like. In other words, even though images of subjects having the same lightness are taken, the brightness obtained from the image sensor shows different values depending on the exposure. Therefore, the value of the number of Stops is not an absolute value, but a relative value. In other words, the number of stops does not represent the brightness.

In taking an image of a subject with a camera, exposure is normally adjusted depending on the lightness of the subject. For example, in order to take an image of a scene at night as illustrated in (1) in FIG. 5 with a camera as an example of a dark subject, typically, camera setting such as lowering a shutter speed or opening an aperture is performed for expressing the gradation in the dark area to avoid crushed shadows in a dark area occupying a major part of the image, and adjustment of the exposure is performed for causing blown-out highlights in a relatively small and blight area in the image.

In order to take an image of a scene in the daytime in a room as illustrated in (2) in FIG. 5 as an example of a subject having a medium lightness with a camera, typically, camera setting for adjusting exposure to balance a dark part and a light part is performed.

In order to take an image of a scene in the daytime outdoor as illustrated in (3) in FIG. 5 as an example of a light subject by camera, typically, camera setting such as increasing the shutter speed or narrowing the aperture is performed for preventing blown-out highlights in a light area occupying a major part of the image.

For converting a relative brightness obtained in this manner to an absolute brightness, relative relationship of exposure with respect to the reference point needs to be calculated.

Figure 6:
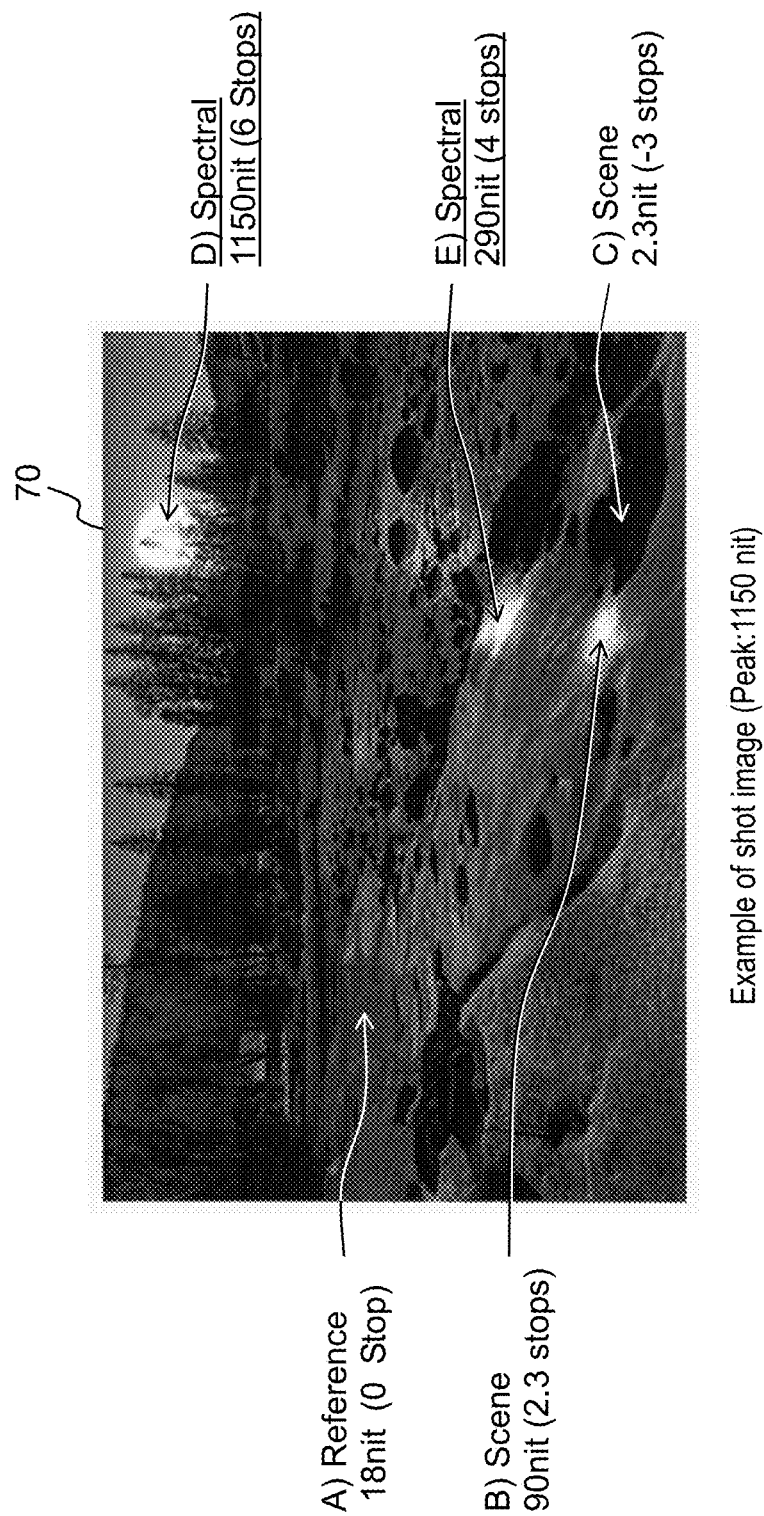
FIG. 6 is a drawing illustrating an exemplary brightness of an image obtained through imaging.

FIG. 6 is a drawing illustrating an exemplary brightness of an image obtained through imaging.

The image obtained through imaging in FIG. 6 is determined as original image 70 below. In original image 70, an area of pixels having a brightness of 18 nit corresponding to 0 stop as a reference lightness is illustrated as area A. In original image 70, an area of pixels having a brightness of 90 nit corresponding to 2.3 stops is illustrated as area B. In original image 70, an area of pixels having a brightness of 2.3 nit corresponding to −3 stops, being almost black, is illustrated as area C. In original image 70, an area of pixels having a brightness of 1150 nit corresponding to 6 stops is illustrated as area D. Pixels obtained through imaging of the sun are included in area D, and very high brightness (for example, the highest brightness in original image 70) is obtained. In original image 70, an area of pixels having a brightness of 290 nit corresponding to 4 stops is illustrated as area E. In the area indicated by area E, pixels obtained by imaging an area where specular reflection occurs are included.

SDR grading processing (mastering processing) for converting original image 70 to an SDR image will be described.

The SDR grading processing is processing for converting a video (original image) of a content obtained through imaging with a camera and having a high-brightness component of more than or equal to 100 nit to meet a broadcasting standard such as BT.709, and is achieved by applying knee curve processing to the original image. The knee curve processing is a processing for converting an input signal with a knee curve, and a knee curve is an input/output conversion curve for compressing and outputting a gain for an input signal of more than or equal to a certain value (knee point). In the SDR grading processing, for brightness lower than or equal to the certain value (knee point) in the original image, the gain is set to "1" (that is, the input brightness is outputted without change), while for the brightness more than or equal to the certain value (knee point), the gain is compressed to maintain the brightness not to exceeds a predetermined brightness. The predetermined brightness may be a highest possible brightness that can be displayed on a display device for displaying the image after processing, or may be 100 nit when the image after processing is to be adapted to BT.709. Therefore, for example, when the SDR grading processing is applied to original image 70, the brightness of original image 70 is maintained linearly as-is by applying the normal grading processing to the brightness more than or equal to the knee point (for example, to a value around 80 nit) and the brightness at or higher than the knee point is reduced to a value so that the highest brightness of original image 70 does not to exceed 100 nit.

Figure 7B:
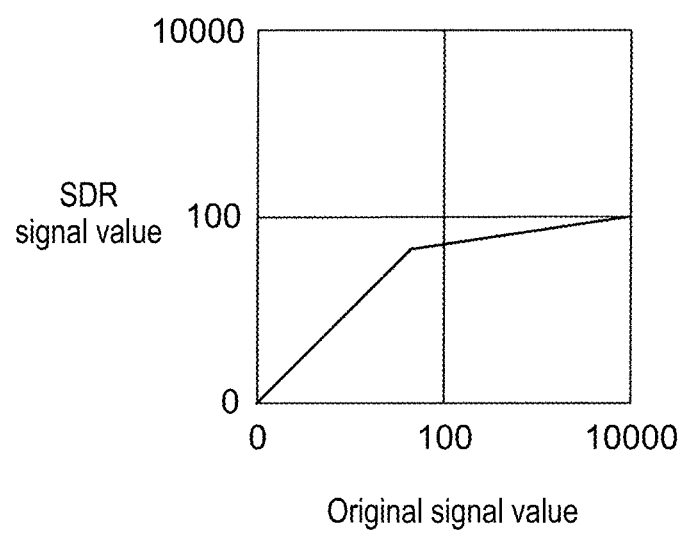
FIG. 7B is a drawing schematically illustrating an exemplary relationship between an original signal value and an SDR signal value for converting (mastering) an original signal value to an SDR signal value.

FIG. 7A is a drawing illustrating an exemplary brightness obtained as a result of mastering original image 70 illustrated in FIG. 6 to SDR image 71. FIG. 7B is a drawing schematically illustrating an exemplary relationship between an original signal value and an SDR signal value for converting (hereinafter, referred to also as "mastering") an original signal value to an SDR signal value. The original signal value is a brightness within a brightness range in a range from 0 nit to the highest brightness (for example, 1150 nit) of the original image (for example, original image 70) (hereinafter, referred to as "brightness of original image"), and the SDR signal value is a brightness within a brightness range of SDR (hereinafter, referred to as "SDR brightness"). In FIG. 7B, the maximum value of the original signal value is set to 10000. However, the maximum value of the original signal value varies depending on the original image. For example, the maximum value of the original signal value is 1150 for original image 70 illustrated in FIG. 6.

Pixels corresponding to 0 stop in original image 70 have a reference brightness corresponding to a reference lightness. Therefore, even after original image 70 is converted into SDR image 71 through mastering from original image 70 to SDR image 71, the brightness of original image 70 (18 nit) corresponding to 0 stop in original image 70 is not changed and maintained at SDR brightness (18 nit) (see an area indicated by area A in SDR image 71 in FIG. 7A).

An example of performing mastering from original image 70 to SDR image 71 with a knee curve illustrated in FIG. 7B will be described below. However, the maximum value of the original signal value illustrated in FIG. 7B in this case is 1150 instead of 10000. The knee point is 90. In this mastering, in a brightness range less than or equal to the brightness of original image 70 corresponding to 90 nit of original image 70 (0 nit to 90 nit), the brightness of original image 70 is not changed and is set to the SDR brightness. In other words, in pixels in a range from 0 nit to 90 nit in original image 70, the brightness of the pixels falls within a range from 0 nit to 90 nit even in SDR image 71 after mastering. In the brightness range for original image 70 higher than the brightness of original image 70 corresponding to 90 nit of original image 70 (90 nit to 1150 nit), the brightness of original image 70 is linearly converted into the SDR brightness within the brightness range from 90 nit to 100 nit. In other words, pixels in original image 70 having a brightness in a range from 90 nit to 1150 nit will have the brightness in a range from 90 nit to 100 nit in SDR image 71 after mastering. For example, as regards pixels corresponding to 90 nit in original image 70, the brightness of original image 70 corresponding to 90 nit in original image 70 is not changed and is maintained to the SDR brightness (see an area indicated by area B in SDR image 71 in FIG. 7A) even after converting original image 70 to SDR image 71 through the mastering from original image 70 to SDR image 71.

For example, as regards pixels corresponding to 2.3 nit in original image 70, the brightness of original image 70 corresponding to 2.3 nit in original image 70 is not changed and is maintained at the SDR brightness (see the area indicated by area C in SDR image 71 in FIG. 7A) even after original image 70 is converted into SDR image 71 through mastering from original image 70 to SDR image 71 in the same manner as described above.

In contrast, for example, as regards pixels having the brightness of 1150 nit in original image 70, the brightness of original image 70 corresponding to 1150 nit in original image 70 is converted into 100 nit corresponding to the highest brightness of SDR through the mastering from original image 70 to SDR image 71 (see an area indicated by area D in SDR image 71 in FIG. 7A).

In contrast, for example, as regards pixels in original image 70 having the brightness of 290 nit, the brightness of original image 70 corresponding to 290 nit in original image 70 is converted into 95 nit through the mastering from original image 70 to the SDR image 71 (see an area indicated by area E in SDR image 71 in FIG. 7A).

Figure 8A:
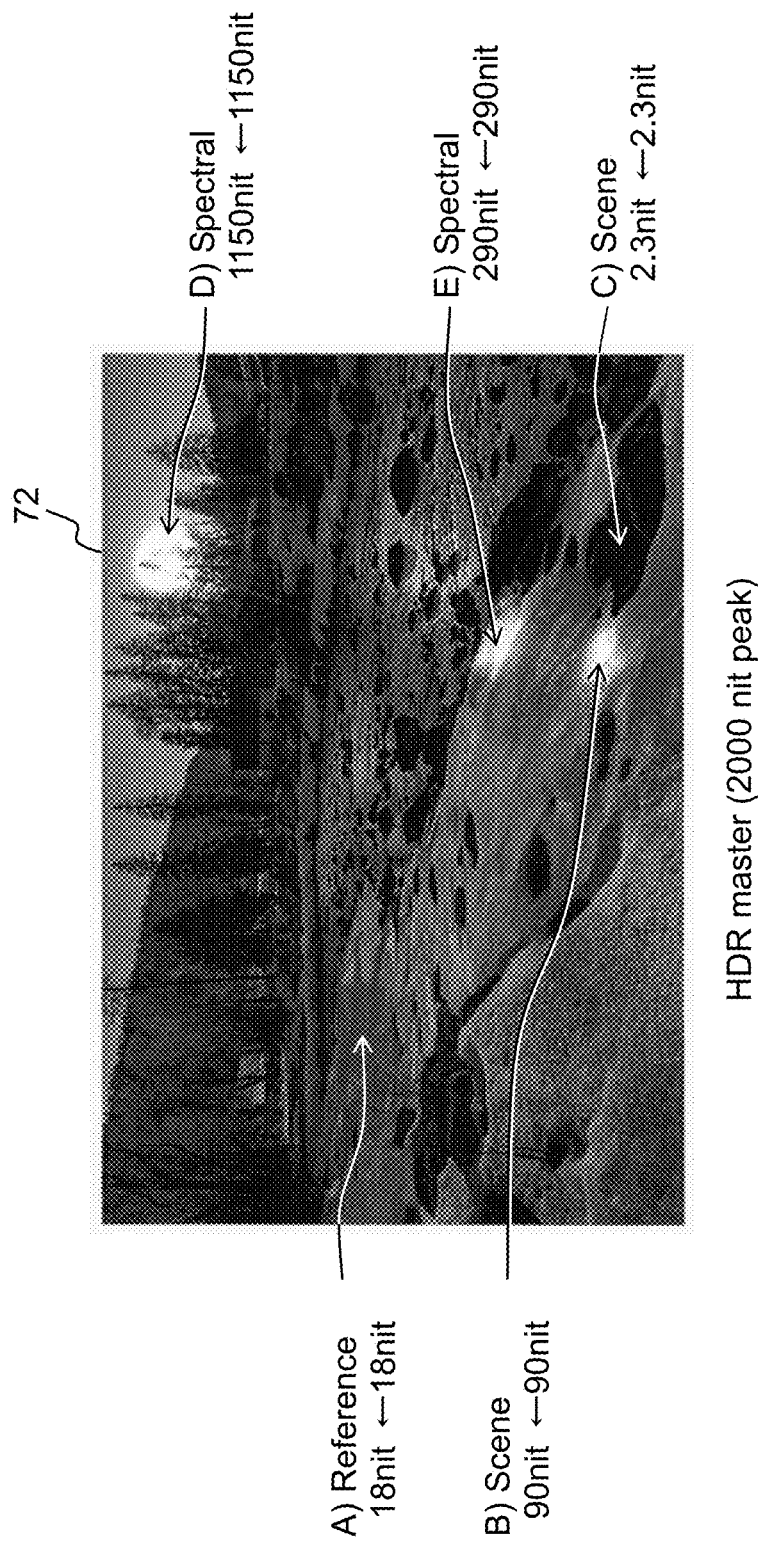
FIG. 8A is a drawing illustrating an exemplary brightness obtained as a result of mastering an original image illustrated in FIG. 6 to an HDR image.
Figure 8B:
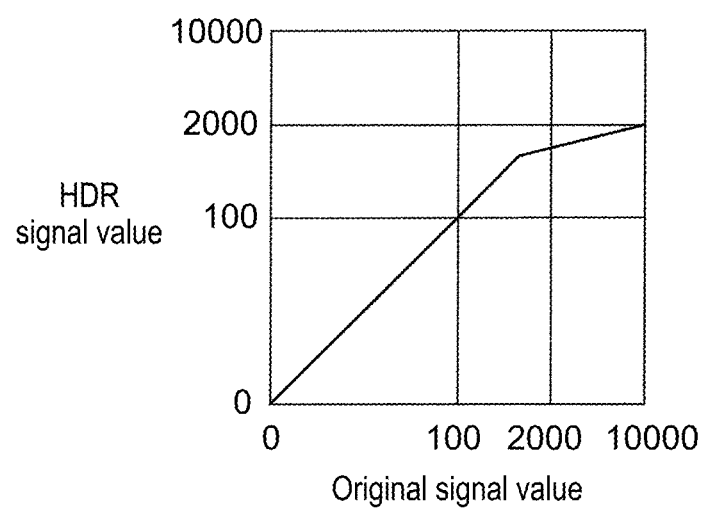
FIG. 8B is a drawing schematically illustrating an exemplary relationship between an original signal value and an HDR signal value for converting (mastering) an original signal value to an HDR signal value.

FIG. 8A is a drawing illustrating an exemplary brightness obtained as a result of mastering original image 70 illustrated in FIG. 6 to HDR image 72. FIG. 8B is a drawing schematically illustrating an exemplary relationship between an original signal value and an HDR signal value for converting (mastering) an original signal value to an HDR signal value. As used herein the term "HDR signal value" is intended to mean the brightness within the brightness range of HDR (hereinafter, referred to as "HDR brightness). In this example, it is assumed that the HDR is allowed to have a brightness up to 2000 nit in the mastering from original image 70 to HDR image 72. In contrast, as illustrated above, the highest brightness of original image 70 is 1150 nit. Therefore, in HDR image 72, the brightness of original image 70 may be maintained as-is.

Pixels corresponding to 0 stop in original image 70 are pixels that have a reference brightness corresponding to a reference lightness. Therefore, as regards those pixels, even after original image 70 is converted to HDR image 72 through mastering from original image 70 to HDR image 72, the brightness of original image 70 is not changed and is set to have the HDR brightness (an area indicated by area A in HDR image 72 in FIG. 8A).

In the same manner, as regards pixels corresponding to 90 nit in original image 70, pixels corresponding to 2.3 nit in original image 70, pixels corresponding to 1150 nit in original image 70, and pixels corresponding to 290 nit in original image 70, the brightness of original image 70 is not changed and is maintained to have the HDR brightness even after original image 70 is converted to HDR image 72 through mastering from original image 70 to HDR image 72 (see areas indicated by area B, area C, area D, and area E in HDR image 72 in FIG. 8A).

Figure 9:
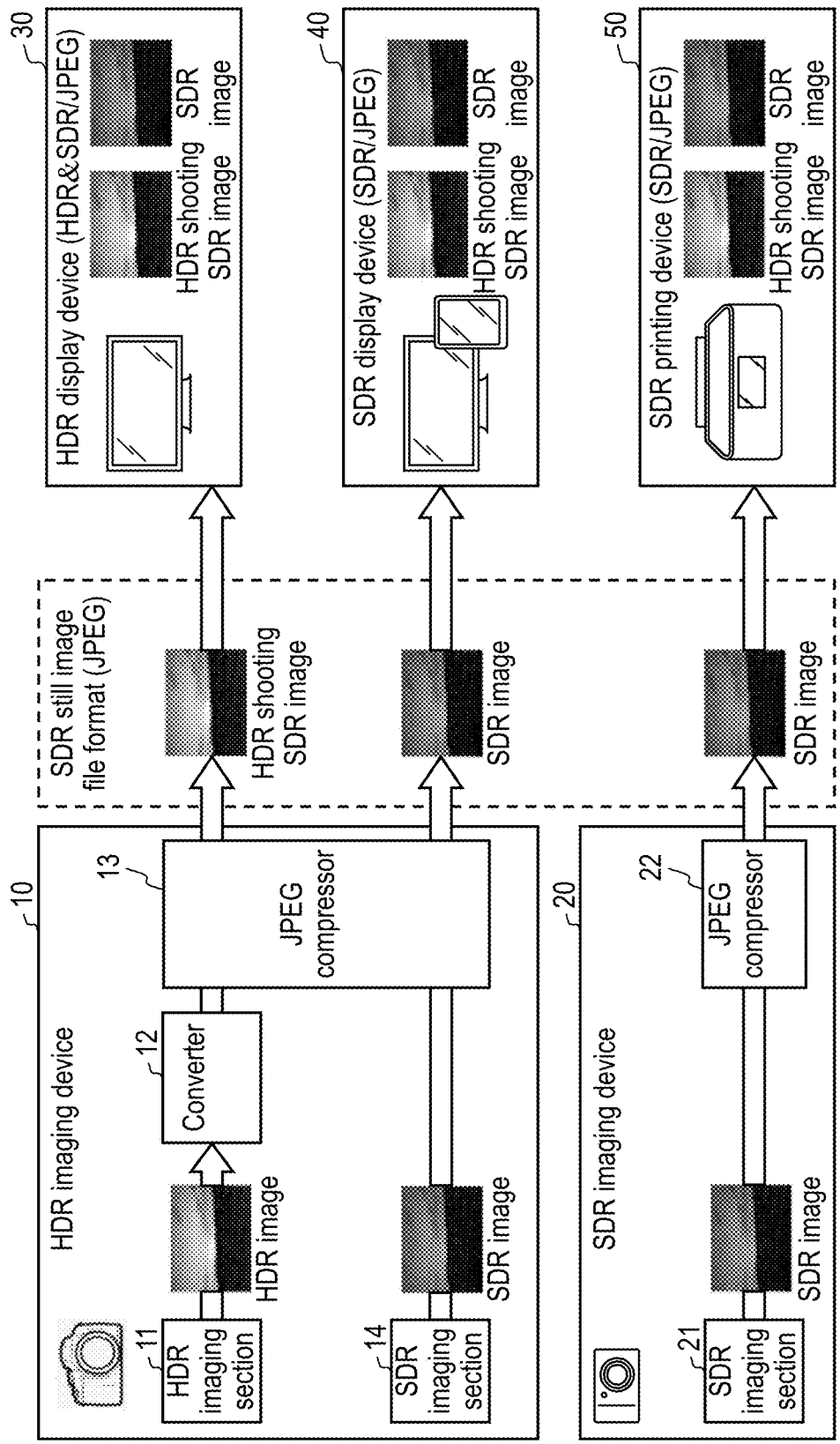
FIG. 9 is a schematic view for explaining imaging devices adaptive to HDR or SDR, file formats of image data obtained by the imaging devices, and a display device configured to display the image data or a printing device configured to print the image data.

FIG. 9 is a schematic view of imaging devices adaptive to HDR or SDR, file formats of image data obtained by the imaging devices, and a display device configured to display the image data or a printing device configured to print the image data.

FIG. 9 illustrates HDR imaging device 10 adaptive to HDR imaging. HDR imaging device 10 includes HDR imaging section 11, SDR imaging section 14, converter 12, and JPEG compressor 13. HDR imaging device 10 is configured to enable SDR display device 40 or SDR printing device 50 to display or print image data obtained through imaging in an HDR shooting mode by HDR imaging section 11. Specifically, converter 12 in HDR imaging device 10 converts HDR still image data of an HDR image obtained through imaging in the HDR shooting mode by HDR imaging section 11, to SDR still image data. In HDR imaging device 10, JPEG compressor 13 JPEG compresses the SDR still image data obtained through conversion by converter 12, and the SDR still image data in a JPEG format obtained through the compression is outputted. In HDR imaging device 10, JPEG compressor 13 also JPEG compresses SDR still image data of an SDR image obtained through imaging in a conventional shooting mode (an SDR shooting mode) by SDR imaging section 14, and the SDR still image data in the JPEG format obtained through the compression is outputted.

SDR imaging device 20 includes SDR imaging section 21 and JPEG compressor 22. In SDR imaging device 20, JPEG compressor 22 JPEG compresses SDR still image data of an SDR image obtained through imaging by SDR imaging section 21 similarly to the case of imaging in the conventional shooting mode (the SDR shooting mode) by HDR imaging device 10, to obtain SDR still image data in the JPEG format to be output.

Accordingly, each of HDR display device 30, SDR display device 40, and SDR printing device 50 acquires SDR still image data obtained through SDR conversion of HDR still image data obtained by HDR imaging, or SDR still image data obtained by SDR imaging, and reproduces (displays or prints) the SDR image according to the SDR still image data.

The HDR shooting mode will be described next with reference to FIG. 10 and FIG. 11.

Figure 10:
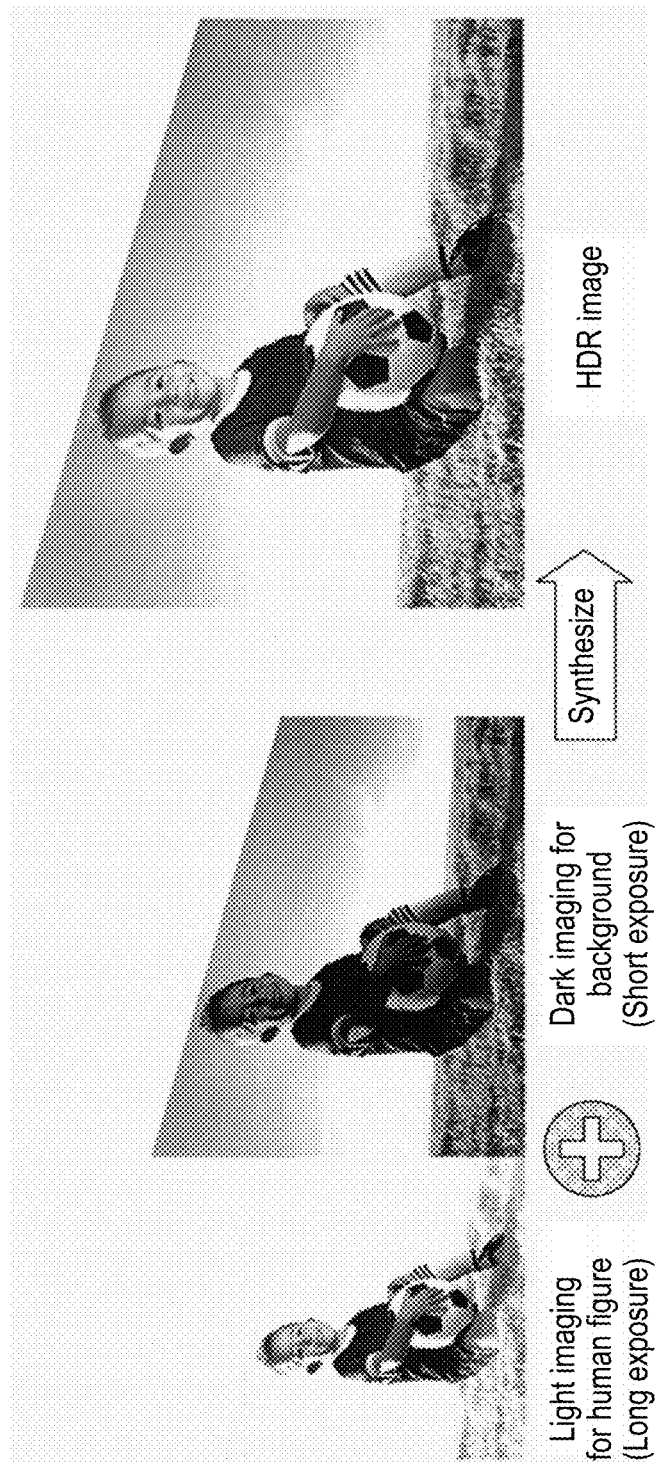
FIG. 10 is a schematic view for explaining an HDR shooting mode for synthesizing two images to obtain an image having an extended dynamic range.
Figure 11:
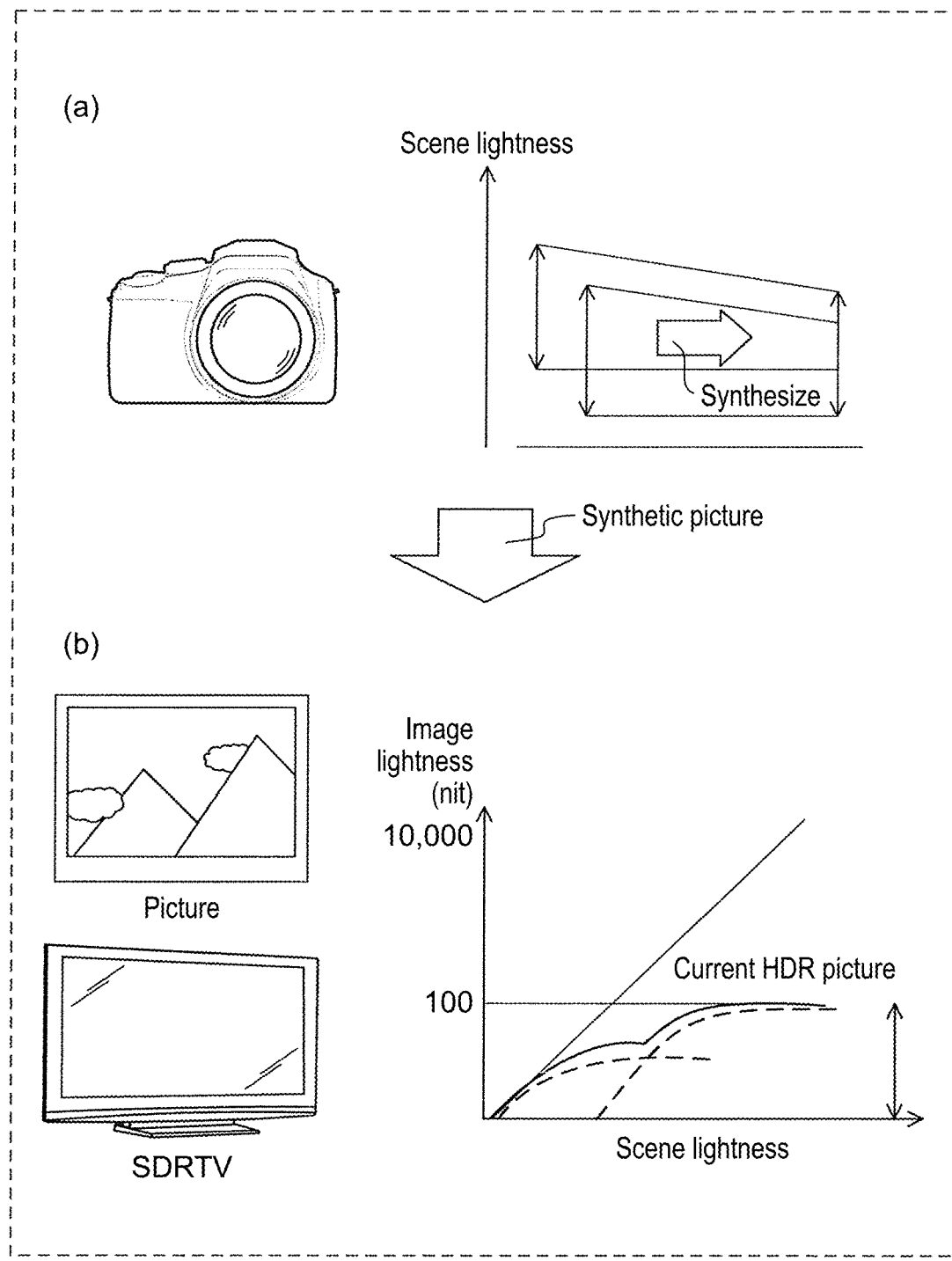
FIG. 11 is a schematic view for explaining the HDR shooting mode for synthesizing two images to obtain an image having an extended dynamic range.

Each of FIG. 10 and FIG. 11 is a schematic view for explaining the HDR shooting mode of synthesizing two images to obtain an image having an extended brightness range (dynamic range).

Some of smartphones, digital cameras, and the like have the HDR shooting mode of imaging video having a wide brightness range (dynamic range). As illustrated in FIG. 10 and a part (a) of FIG. 11 in the HDR shooting mode, two SDR images obtained through double exposure (a technique of imaging an identical subject a plurality of times under exposure conditions different from each other) or the like are synthesized to have brightness within the range according to SDR, so as to obtain HDR image data having such a wider brightness range (dynamic range). As illustrated in FIG. 10 and a part (b) of FIG. 11, an HDR image can thus be displayed by an SDR display device.

An HDR image obtained through imaging for HDR display will be described next with reference to FIG. 12.

Figure 12:
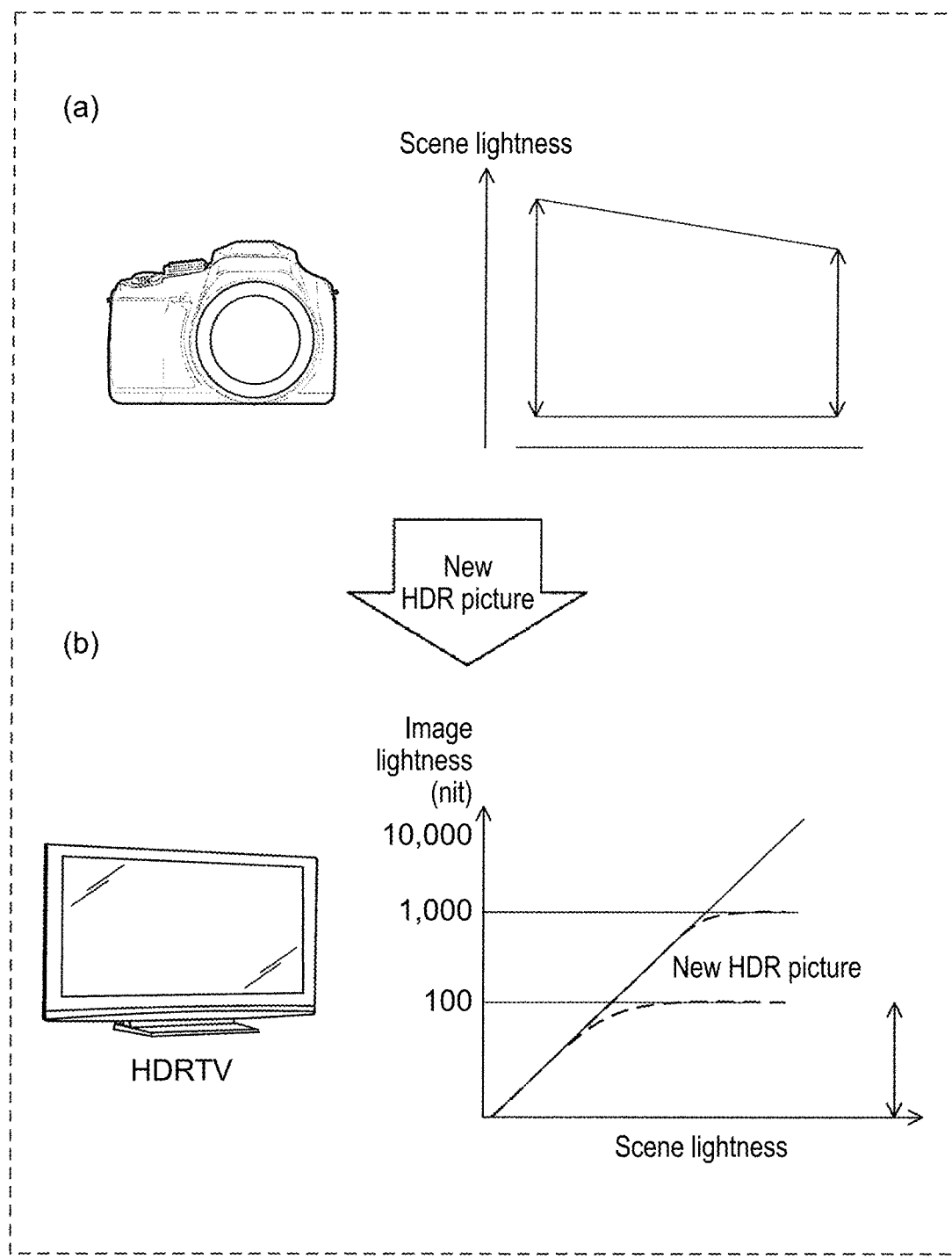
FIG. 12 is a schematic view for explaining an HDR image obtained through imaging for HDR display.

FIG. 12 is a schematic view for explaining an HDR image obtained through imaging for HDR display.

As illustrated in FIG. 12, the HDR image for HDR display is imaged such that an imaging target scene has lightness within a brightness range (dynamic range) wider than a brightness range of an SDR shooting mode. Grading processing is applied to image data obtained through the imaging to generate an HDR image for HDR display, and the HDR image is transmitted to each device for reproduction. An HDR image is wider in brightness range (dynamic range) than an SDR image and cannot be displayed simply by an SDR display device. Displaying an HDR image with an SDR display device requires conversion from the HDR image to an SDR image.

In the HDR shooting mode described with reference to FIG. 10 and FIG. 11, the image generated through synthesis has brightness within the brightness range determined by SDR and can thus be reproduced by both HDR display device 30 and SDR display device 40 (or SDR printing device 50).

The description will continue with reference again to FIG. 9. There has recently been proposed an HDR display device such as an HDRTV, configured to display HDR image data for HDR image display without SDR conversion.

Unlike the HDRTV, a camera having the HDR shooting mode (an HDR imaging function) is configured in accordance with the HDR technique mainly for backlight correction and the like. A still image obtained through imaging with the camera in accordance with the HDR technique may be reproduced by an SDR display device or an SDR printing device. Although the camera includes an imaging device configured to generate HDR image data for video and can execute imaging according to the HDR technique, the camera performs SDR conversion on an HDR image obtained in the HDR shooting mode and outputs SDR still image data. The camera having the HDR imaging function may be configured to generate HDR image data having a wide brightness range (dynamic range) utilizing display capability of an HDRTV, but may not generate such HDR image data.

Figure 13:
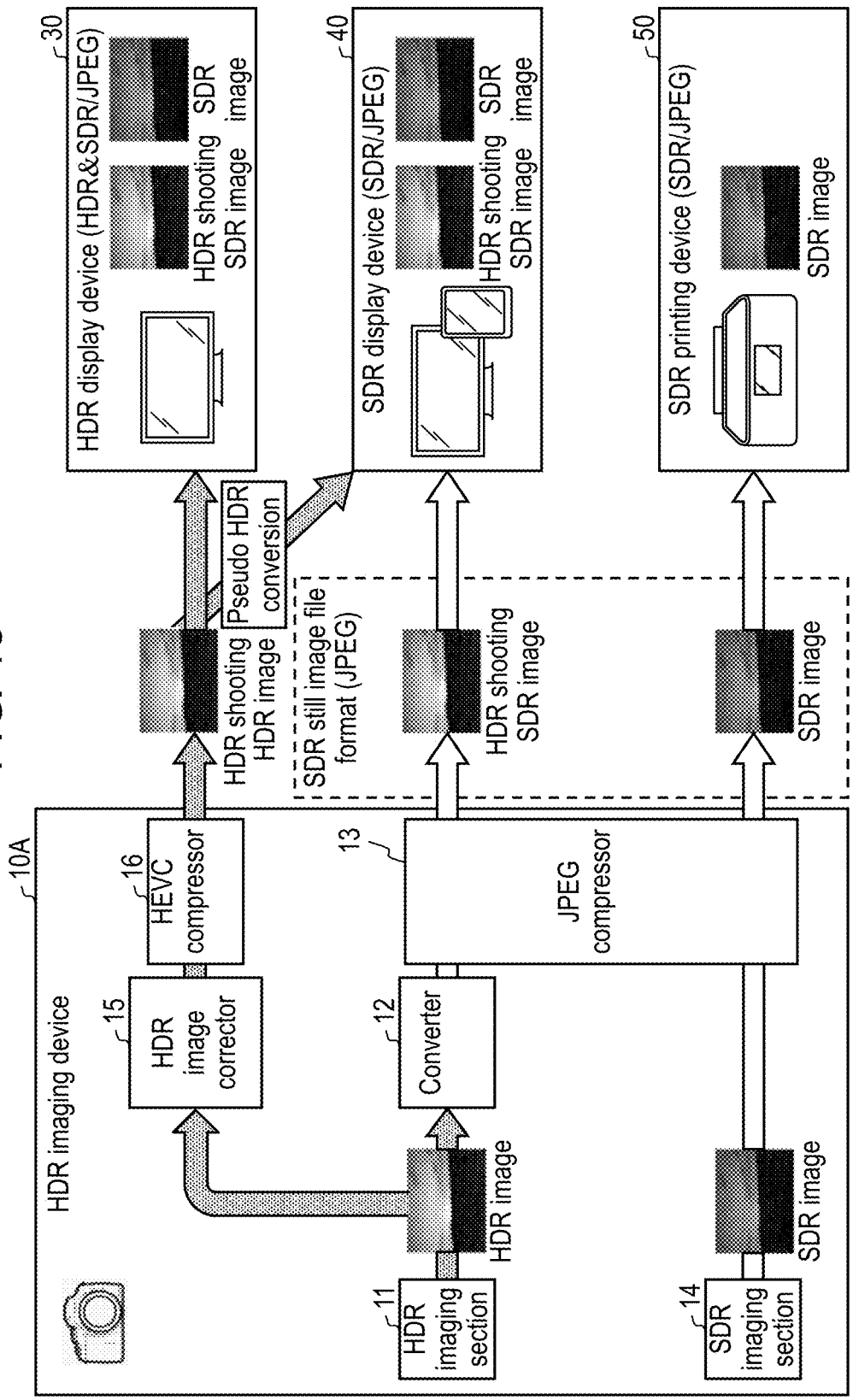
FIG. 13 is a schematic view for explaining problems to be solved when making an SDR printing device print images.

FIG. 13 is a schematic view for explaining problems to be solved when making SDR printing device 50 print images.

In order to utilize an HDR display function of the HDRTV (e.g. HDR display device 30), the HDRTV simply displays HDR image data generated for HDR display without conversion to SDR image data.

HDR imaging device 10A illustrated in FIG. 13 includes HDR imaging section 11, SDR imaging section 14, converter 12, JPEG compressor 13, HDR image corrector 15, and high efficiency video coding (HEVC) compressor 16. In HDR imaging device 10A, HDR image corrector 15 corrects an HDR image to generate HDR image data.

HDR image corrector 15 converts RAW data obtained through imaging by HDR imaging section 11 or the like to a 10-bit image that can be displayed by the HDRTV (e.g. HDR display device 30 adaptive to an HDR 10 standard) with use of an HDR-electro-optical transfer function (HDR-EOTF) such as a PQ curve. HDR imaging device 10A outputs HDR image data obtained by HDR image corrector 15 to the HDRTV (for example, HDR display device 30) from HEVC compressor 16 through a registered trademark High-Definition Multimedia Interface (HDMI). The HDRTV (e.g. HDR display device 30) having received the HDR image data then displays an HDR image according to the HDR image data.

By performing pseudo HDR conversion on the HDR image data and outputting the pseudo HDR image of SDR system obtained by the pseudo HDR conversion to SDR display device 40, an image of higher quality than the SDR image data displayed on SDR display device 40 can be displayed. As used herein the term "pseudo HDR conversion" is intended to include converting the HDR image to an image of SDR system (pseudo HDR image) having a brightness range (dynamic range) adapted to the highest possible brightness that can be displayed by SDR display device 40.

However, SDR printing device 50 cannot print the HDR image data having a high quality. Therefore, SDR printing device 50 prints SDR image data obtained through image taking in the conventional SDR shooting mode. In other words, even though the high quality HDR image data is obtained, SDR printing device 50 cannot print an image having a high quality from the high quality HDR image data.

Hereinafter, exemplary embodiments will be described below in detail with reference to the drawings as appropriate. However, a detailed description beyond necessity may be omitted. For example, detailed descriptions of already well-known matters, a duplicated description of a substantially identical configuration, and the like may be omitted. This is to avoid unnecessarily redundancy in the following description, and to facilitate understanding by those skilled in the art.

The accompanying drawings and the following description are provided to help those skilled in the art to fully comprehend the present disclosure and are not intended to limit the subject matter recited in the patent claims.

The drawings have illustrating that are not necessarily accurate, and are provided as schematic views appropriately omitted or the like for easier comprehension of the present disclosure. In the respective drawings, substantially identical constituent elements are given identical reference marks. Descriptions of those constituent elements may be omitted or simplified.

1. First Exemplary Embodiment

The exemplary embodiment discloses, an image processing device configured to generate still image data for enabling SDR printing device 50 to print high-quality images.

1-1. Configuration

Figure 14:
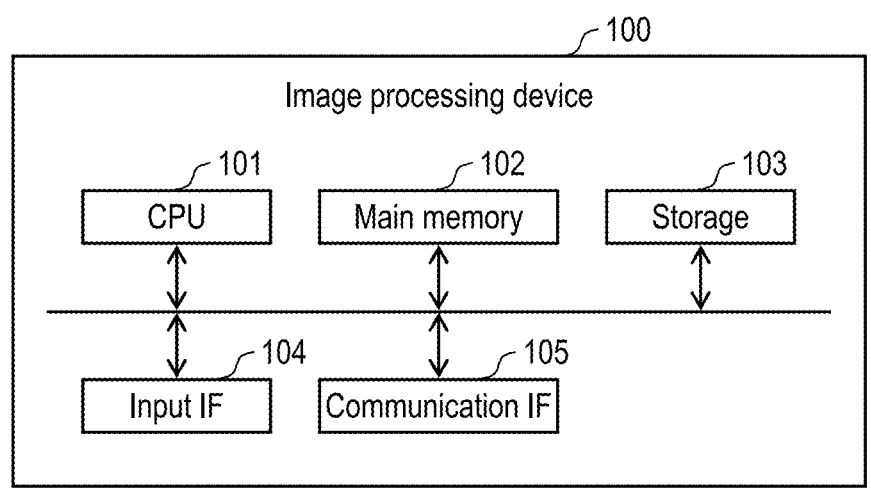
FIG. 14 is a block diagram schematically illustrating an exemplary hardware configuration of an image processing device according to a first exemplary embodiment.

FIG. 14 is a block diagram schematically illustrating an exemplary hardware configuration of image processing device 100 according to a first exemplary embodiment.

As illustrated in FIG. 14, image processing device 100 includes, as a hardware configuration, central processing unit (CPU) 101, main memory 102, storage 103, input interface (IF) 104, and communication interface (IF) 105. CPU 101 is a processor configured to execute a control program stored in storage 103 or the like.

Main memory 102 is a volatile memory area that CPU 101 uses as a work area used for executing the control program. Main memory 102 may be composed of, for example, a semiconductor memory or the like.

Storage 103 is a non-volatile memory area maintaining a control program and contents. Storage 103 includes, for example, magnetic disks, optical disks, magneto optical disks, or semiconductor memories.

Input IF 104 includes, keyboards, mouses, touch pads, buttons, touch panels, and the like.

Communication IF 105 is a communication interface configured to communicate with other devices via communication network. Other devices include, for example, printing device 200, input device 300, and the like, described later. Communication IF 105 is, for example, a wireless local area network (LAN) interface adapted to IEEE802.11a, b, g, n standards, and may include a third generation mobile communication system (3G), a fourth generation mobile communication system (4G), a wireless communication interface adapted to a communication standard used in a mobile communication system such as a long term evolution (LTE) (registered trademark), and a wireless communication interface adapted to Bluetooth (registered trademark) standard. Communication IF 105 may be a wired communication interface such as a wired LAN interface, a Universal Serial Bus (USB) interface and the like.

Figure 15:
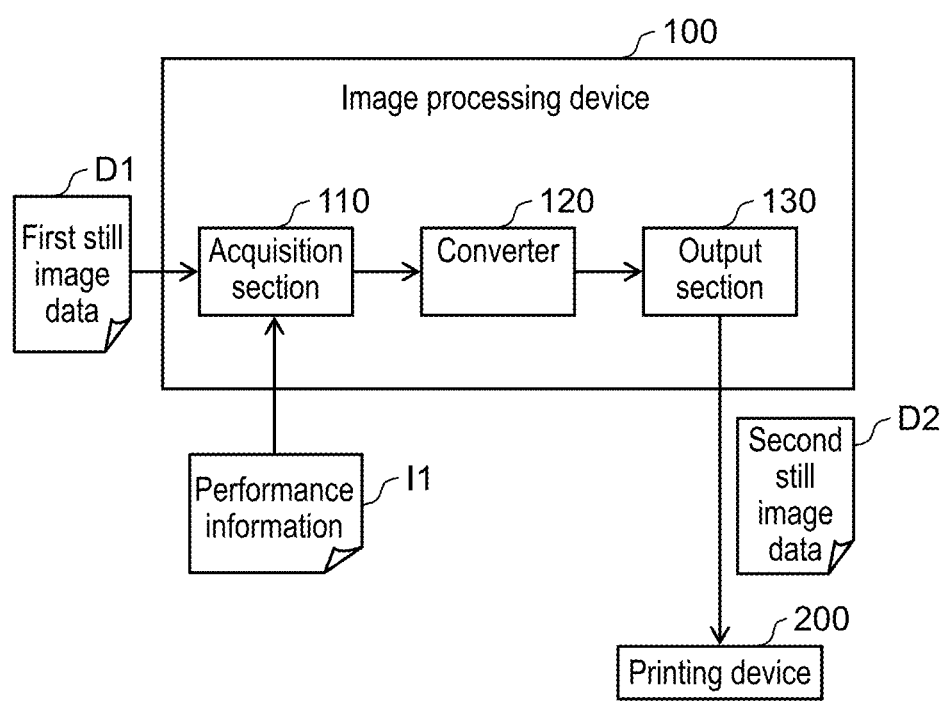
FIG. 15 is a block diagram schematically illustrating a first example of a functional configuration of the image processing device according to the first exemplary embodiment.

FIG. 15 is a block diagram schematically illustrating a first example of a functional configuration of an image processing device according to the first exemplary embodiment.

Image processing device 100 includes acquisition section 110, converter 120, and output section 130. Image processing device 100 may be a device implemented by being incorporated in an imaging device or may be provided as an independent device. Printing device 200 is connected to image processing device 100 via wired connection or wireless connection. Printing device 200 is an example of SDR printing device 50 illustrated in FIG. 9.

Acquisition section 110 acquires a first still image data D1 acquired through imaging and ability information I1 indicating printing performance of printing device 200. The brightness range of first still image data D1 is defined in the first dynamic range. The first dynamic range is, for example, a high dynamic range (HDR).

Acquisition section 110 may acquire paper information indicating a paper type used in printing by printing device 200 (or paper set in printing device 200) as performance information I1. The paper information may be included, for example, in command issued when a user makes printing device 200 print an image (hereinafter, referred to also as "printing command").

Acquisition section 110 may acquire a printed result acquired by printing a specific pattern (hereinafter, referred to as a "test pattern") on paper used in printing device 200 as performance information I1. Acquisition section 110 may acquire a printed result from a user inputting the printed result into image processing device 100 (or printing device 200). The printed result will be described later.

Acquisition section 110 may acquire first still image data D1 from the imaging device, an information terminal, a memory device, or the like connected to image processing device 100 via wired connection or wireless connection. Acquisition section 110 that acquires first still image data D1 may be implemented, for example, by communication IF 105 (see FIG. 14).

Acquisition section 110 may acquire a printing command including paper information as performance information I1 by receiving from an input operation by a user. Acquisition section 110 that acquires performance information I1 may be implemented, for example, by input IF 104 (see FIG. 14). Acquisition section 110 may acquire performance information I1 without acquiring the printing command.

Converter 120 converts first still image data D1 acquired by acquisition section 110 into second still image data D2 according to a printing performance indicated by performance information I1 acquired by acquisition section 110. Second still image data D2 is still image data defined in a second dynamic range having a narrower brightness range than the first dynamic range.

When performance information I1 is paper information including the paper type, converter 120 references information indicating a predetermined relationship, and thus specifies a reflection brightness corresponding to the paper type indicated by the paper information acquired by acquisition section 110. Note that the information indicating the predetermined relationship is information indicating the relationship between a plurality of paper types and reflection brightness corresponding to each of the plurality of the paper types. Converter 120 may determine the brightness range (dynamic range) having the highest brightness at the reflection brightness specified by the paper information to be the second dynamic range and convert data from first still image data D1 into second still image data D2. As used herein the word "reflection brightness" is intended to mean the brightness of light reflected from paper when the paper is irradiated with light at a specified brightness. The specified brightness may be defined by brightness indicating typical lightness in a room or may be any brightness determined as desired. The information indicating the predetermined relationship (the relationship between the plurality of paper types and the reflection brightness) can be obtained by irradiating each of the plurality of paper types with light and measuring the brightness reflected from each paper. The information indicating the predetermined relationship between the plurality of paper types and reflection brightness may be listed in a table in one to one correspondence or may be stored in storage 103. The information indicating the predetermined relationship may be acquired from an external information processing device (not illustrated) via communication network.

When performance information I1 acquired by acquisition section 110 includes information indicating the printed result, converter 120 sets the brightness range (dynamic range) determined according to the printed result as the second dynamic range. Converter 120 converts first still image data D1 to second still image data D2 based on the second dynamic range.

Converter 120 may be implemented by CPU 101, main memory 102, and storage 103 (see FIG. 14) and the like. Converter 120 may be implemented by a specific circuit configured with a semiconductor integrated circuit.

Output section 130 outputs second still image data D2 converted from first still image data D1 by converter 120 to printing device 200. Output section 130 may be, for example, implemented by communication IF 105 (see FIG. 14).

Printing device 200 receives second still image data D2 from image processing device 100 and a printing command from a user. Printing device 200 prints a still image indicated by second still image data D2 received on paper of a specified type by the received printing command.

Note that image processing device 100 may output the printing command for making printing device 200 print a test pattern and making printing device 200 print the test pattern. Image processing device 100 may be provided with a display (not illustrated). Alternatively, a display may be connected to image processing device 100. Image processing device 100 may output a printing command to make printing device 200 print the test pattern and then display on the display an input command to make a user input the printed result obtained by the test pattern printed on paper. The input command may be, for example, a message, image, or user interface (UI) or the like that prompts a user to input the printed result obtained from the paper with printed test pattern.

Figure 16:
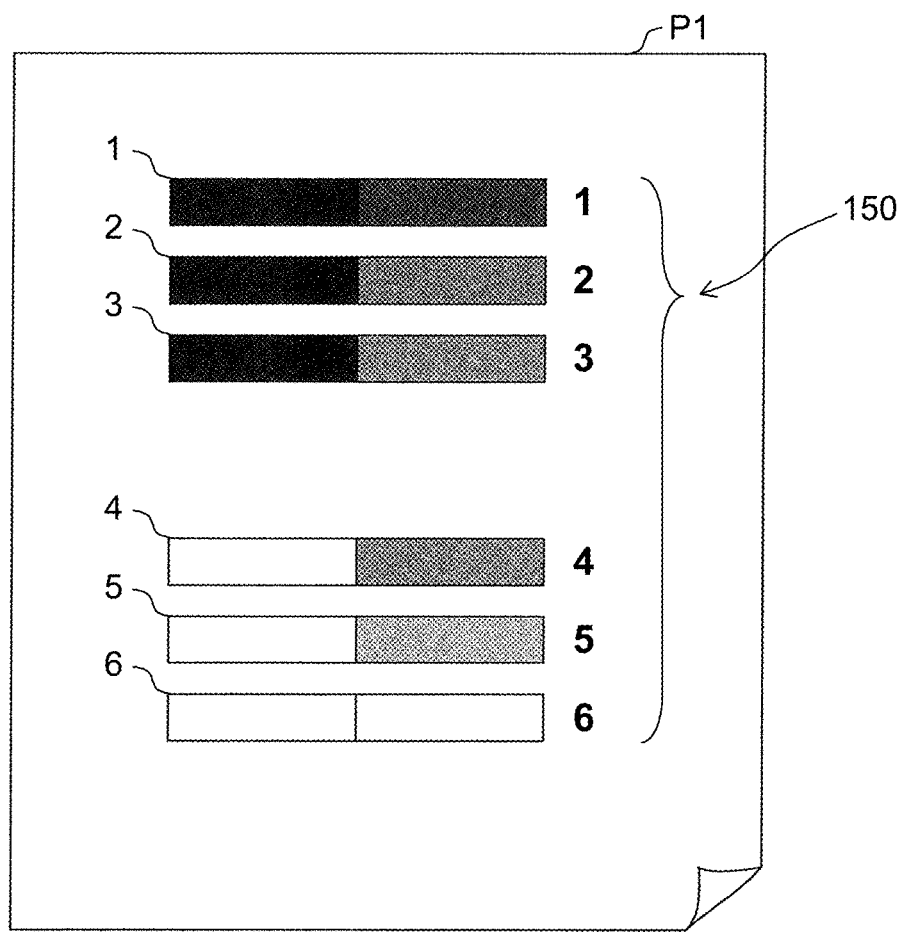
FIG. 16 illustrates an example of result of printing of a test pattern on paper according to the first exemplary embodiment.

FIG. 16 illustrates an example of result of printing of test pattern 150 on paper according to the first exemplary embodiment.

In this exemplary embodiment, for example, test pattern 150 illustrated in FIG. 16 is printed as a specific pattern (test pattern) on paper P1 used for printing by printing device 200. Test pattern 150 illustrated as an example in FIG. 16 includes patterns 1 to 3, and patterns 4 to 6. Patterns 1 to 3, as illustrated in FIG. 16, include three black parts as comparative references on the upper left part (upper left part in FIG. 16) in parallel in the vertical direction, and gray parts on the areas of the respective black parts. The darkness of the gray parts is reduced from the top to the bottom in sequence on paper P1. In other words, patterns 1 to 3 are patterns having the three black parts disposed on the left side of paper P1 (left side in FIG. 16) for comparative references and the gray parts disposed on the right of the respective black parts and changing from pale gray to dark gray in three steps. Patterns 4 to 6, as illustrated in FIG. 16, include three white parts as comparative reference on the lower left part (lower left part in FIG. 16) in parallel in the vertical direction, and gray parts on the areas of the respective white parts. The darkness of the gray parts is reduced from the top to the bottom in sequence on Paper P1. In other words, patterns 4 to 6 are patterns having the three white parts disposed on the left side of paper P1 (left side in FIG. 16) for comparative references and the gray parts disposed on the right of the respective white parts and changing from pale gray to paler gray in three steps. As illustrated in FIG. 16, patterns 1 to 6 are allocated with numbers 1 to 6 for discriminating patterns 1 to 6.

The positions of arrangement of patterns 1 to 6 are not limited to the positions of arrangement illustrated in FIG. 16 by any means. The respective patterns may be arranged in the horizontal direction. The patterns other than patterns 1 to 6 may be included in test pattern 150. Test patterns included in test pattern 150 may include 5 or less, or 7 or more patterns. For example, in addition to patterns 1 to 6, test pattern 150 in FIG. 16 may further include a singular or a plurality of patterns changed in darkness of gray parts in small steps.

Image processing device 100 displays an input command prompting a user to see paper P1 with printed test pattern 150 and input the pattern number that a user can (or cannot) recognize gradation difference between black (or white) as comparative reference and gray to image processing device 100 (or printing device 200) through a display or the like. In contrast, a table listing combinations between patterns 1 to 3 and patterns 4 to 6 (for example, 9 combinations) and brightness range (dynamic range) associated in one-to-one correspondence is stored in, for example, storage 103 of image processing device 100. A user then perform an input operation according to the input command and thus image processing device 100 acquires a combination of patterns 1 to 6. The combination of numbers acquired in this manner is referred to as "printed result" in the exemplary embodiment. The combination of the numbers described above is an example of the printed result. In test pattern 150 in FIG. 16, for example, alphabets, signs, or other characters, or combinations thereof may be used instead of the number.

Image processing device 100 selects one brightness range corresponding to two numbers (that is, one of the numbers of patterns 1 to 3 and one of the numbers of patterns 4 to 6) input by a user from the brightness range associated with the combinations of, for example, 9 types of combinations of numbers allocated to patterns 1 to 6 as the second dynamic range for the paper. Specific example of the operation described above will be shown below. For example, image processing device 100 displays an input command prompting a user to input the smallest pattern number among patterns 1 to 3 that a user can discriminate the gradation and the largest pattern number among patterns 4 to 6 that a user can discriminate the gradation through a display or the like. Image processing device 100 selects a brightness range associated in advance with a combination of two pattern numbers input by a user according to the input command, and determines the selected brightness range as the second dynamic range. In this manner, image processing device 100 determines the second dynamic range.

Figure 17:
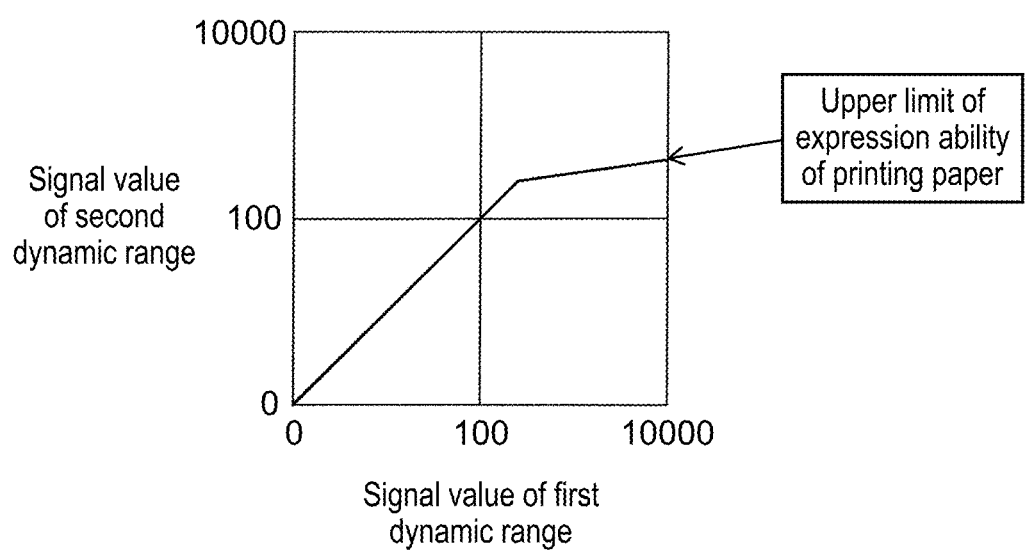
FIG. 17 is a view schematically illustrating an exemplary relationship between a signal value of a first dynamic range and a signal value of a second dynamic range for conversion from a first dynamic range to a second dynamic range by a converter in the first exemplary embodiment.

FIG. 17 is a view schematically illustrating an exemplary relationship between a signal value of a first dynamic range and a signal value of a second dynamic range for conversion from a first dynamic range to a second dynamic range by converter 120 in the first exemplary embodiment. The signal value of the first dynamic range is, for example, brightness in HDR, and the signal value of the second dynamic range is brightness in a brightness range (dynamic range) having highest brightness smaller than the highest brightness of HDR.

The display device displays image by adjusting strength of light emission in the three primary colors of light, namely Red, Green, and Blue (RGB) from one pixel to another. Therefore, in the display device, the image is expressed based on absolute brightness. In contrast, the printing device prints a plurality of inks including Cyan, Magenta, Yellow, and blacK (CMYK) on paper and thus the image is expressed. The image printed on paper is expressed in brightness of light reflected depending on the ink applied to the paper. Therefore, the highest brightness of the image corresponds to brightness in a white area (white of paper) without being applied with ink. The lightness of light reflected from paper varies depending on the paper type (reflectance ratio of paper), brightness of light radiated on paper, an angle of light radiated on paper, and the like.

Therefore, an effective way to print an image having a high quality with expanded brightness range (dynamic range) on paper is to perform conversion processing for converting the signal level in the HDR image from the first dynamic range to the second dynamic range considering the paper type, the type and lightness of the light source for illuminating an environment of installation of paper having been printed images.

Converter 120 converts, for example, HDR image data as first still image data D1 into second still image data D2 by converting the first dynamic range to the second dynamic range having the highest brightness corresponding to the utmost possible expression ability of paper (brightness expressed by white of paper) as illustrated in FIG. 17. The highest brightness expressed by white of paper can be obtained from the reflectance ratio of the paper. Converter 120 may calculate a brightness of reflected light when light having a specified brightness reflects from white of paper (hereinafter, referred to as "reflection brightness") by using a reflectance ratio of the paper and determine the calculated reflection brightness as an upper limit of the expression ability of the corresponding paper.

Converter 120 may also acquire the highest brightness in first still image data D1 and convert first still image data D1 to second still image data D2 by converting the brightness range (dynamic range) to make the highest brightness in first still image data D1 be the reflection brightness.

1-2. Operation

Figure 18:
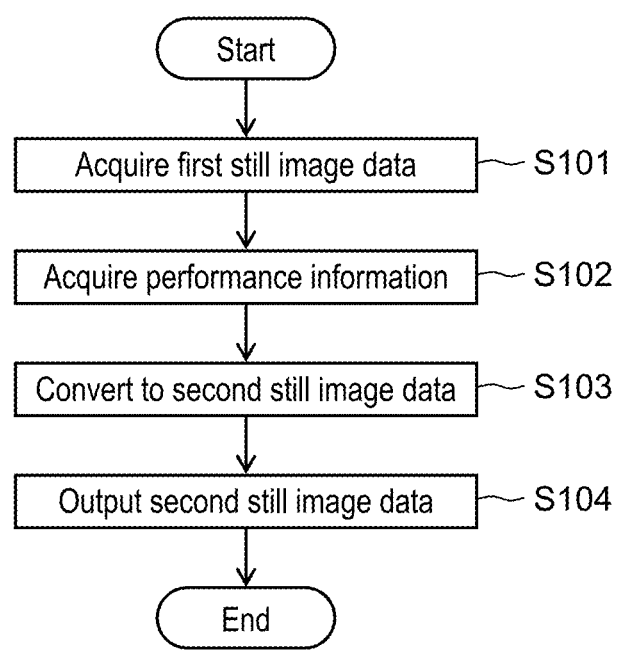
FIG. 18 is a flowchart illustrating exemplary operation of the image processing device according to the first exemplary embodiment.

FIG. 18 is a flowchart illustrating exemplary operation of image processing device 100 according to the first exemplary embodiment.

Acquisition section 110 acquires first still image data D1 (Step S101).

Acquisition section 110 acquires performance information I1 (Step S102).

Converter 120 converts first still image data D1 acquired by acquisition section 110 into second still image data D2 according to a printing performance indicated by performance information I1 acquired by acquisition section 110 based on the second dynamic range (Step S103).

Output section 130 outputs second still image data D2 converted from first still image data D1 by converter 120 to printing device 200 (Step S104).

1-3. Effects and Others

As described above, the image processing device according to the exemplary embodiment includes: an acquisition section configured to acquire first still image data obtained through imaging and having a brightness range defined in a first dynamic range and performance information indicating a printing performance of a printing device; a converter configured to convert the first still image data acquired by the acquisition section to second still image data defined in a second dynamic range having a smaller brightness range than the first dynamic range depending on the printing performance indicated by the performance information acquired by the acquisition section; and an output section configured to output the second still image data converted by the converter to the printing device.

In the exemplary embodiment, the image processing method includes: acquiring first still image data obtained through imaging and having a brightness range defined in a first dynamic range and performance information indicating a printing performance of a printing device; converting the first still image data acquired by the acquisition section to second still image data defined in a second dynamic range having a smaller brightness range than the first dynamic range depending on the printing performance indicated by the performance information acquired; and outputting the second still image data converted to the printing device.

Image processing device 100 is an example of the image processing device. First still image data D1 is an example of the first still image data. Printing device 200 is an example of the printing device. Performance information I1 is an example of the performance information. Acquisition section 110 is an example of the acquisition section. Second still image data D2 is an example of the second still image data. Converter 120 is an example of the converter. Output section 130 is an example of the output section.

For example, in the example described in the first exemplary embodiment, image processing device 100 includes acquisition section 110 configured to acquire first still image data D1 obtained through imaging and having a brightness range defined in a first dynamic range and performance information I1 indicating a printing performance of printing device 200, converter 120 configured to convert first still image data D1 acquired by acquisition section 110 to second still image data D2 defined in a second dynamic range having a smaller brightness range than the first dynamic range depending on the printing performance indicated by performance information I1 acquired by acquisition section 110, and output section 130 configured to output second still image data D2 converted by converter 120 to printing device 200.

In the example described in the first exemplary embodiment, an image processing method executed by image processing device 100 includes: acquiring first still image data D1 obtained through imaging and having a brightness range defined in a first dynamic range (Step S101); acquiring performance information I1 indicating a printing performance of printing device 200 (Step S102); converting first still image data D1 acquired to second still image data D2 defined in a second dynamic range having a smaller brightness range than the first dynamic range depending on the printing performance indicated by performance information I1 acquired (Step S103); and outputting second still image data D2 converted to printing device 200 (Step S104).

Image processing device 100 configured in this manner is capable of converting first still image data D1 into second still image data D2 defined in the second dynamic range determined depending on the printing performance of printing device 200 and outputting second still image data D2 to printing device 200. Therefore, image processing device 100 is capable of making printing device 200 print an image based on first still image data D1 in a brightness range (dynamic range) depending on the printing performance of printing device 200. Therefore, image processing device 100 is capable of making printing device 200 print the high-quality image based on first still image data D1.

In the image processing device, the acquisition section may acquire paper information indicating the paper type to be used for printing by the printing device as the performance information. The converter may specify the reflection brightness corresponding to the paper type indicated by the paper information acquired by the acquisition section by referring to the relationship between the plurality of paper types and the reflection brightness of light reflected from the paper when radiating the light onto the paper. The converter may convert the first still image data into the second still image data with the brightness range having the highest brightness at the specified reflection brightness as the second dynamic range.

For example, in the example described in the first exemplary embodiment, acquisition section 110 of image processing device 100 acquires the paper information indicating the paper type used for printing by printing device 200 as performance information I1. Converter 120 specifies the reflection brightness corresponding to the paper type indicated by the paper information acquired by acquisition section 110 by referring to the relationship between the plurality of paper types and the reflection brightness of light reflected from the paper when radiating the light onto the paper. Converter 120 determines the brightness range having the highest brightness at the specified reflection brightness to be the second dynamic range, and converts first still image data D1 into second still image data D2.

Image processing device 100 configured in this manner is capable of converting first still image data D1 into second still image data D2 defined in the second dynamic range based on the paper type used for printing by printing device 200 and outputting second still image data D2 to printing device 200. Therefore, image processing device 100 is capable of making printing device 200 print an image based on first still image data D1 in a brightness range (dynamic range) depending on the expression ability of the paper. Therefore, image processing device 100 is capable of making printing device 200 print the high-quality image based on first still image data D1.

In the image processing device, the acquisition section may acquire a printed result acquired by the printing device printing the specific pattern on paper used for printing by the printing device as the performance information. The converter may convert data from the first still image data into the second still image data with the brightness range determined depending on the printed result acquired by the acquisition section set to be the second dynamic range.

Test pattern 150 illustrated in FIG. 16 is an example of the specific pattern. The combination of the numbers of patterns 1 to 6 that image processing device 100 can acquire from a user referencing paper P1 with test pattern 150 printed as illustrated in FIG. 16 is an example of the printed result.

For example, in the example described in the first exemplary embodiment, acquisition section 110 of image processing device 100 acquires a printed result acquired by printing device 200 printing the specific pattern on paper used for printing by printing device 200 as performance information I1. Converter 120 converts data from first still image data D1 into second still image data D2 with the brightness range determined depending on the printed result acquired by acquisition section 110 set to be the second dynamic range.

Image processing device 100 configured in this manner is capable of printing the specific pattern on paper used for printing by printing device 200, acquiring a printed result based on paper P1 having a specific pattern printed from a user, and determining the second dynamic range depending on the printed result acquired. Image processing device 100 is capable of converting first still image data D1 into second still image data D2 defined in the second dynamic range and outputting second still image data D2 to printing device 200. In other words, image processing device 100 is capable of estimating the expression ability of paper to be used by printing device 200 for printing (that is, the brightness range having the highest brightness at brightness expressed by white part of the paper) easily and determining the second dynamic range easily by setting the brightness range (dynamic range) adequate for the expression ability of the paper. Therefore, image processing device 100 is capable of making printing device 200 print the high-quality image based on first still image data D1.

In the image processing device, the first dynamic range may be the HDR.

For example, in an example described in first exemplary embodiment, the first dynamic range in image processing device 100 is the HDR.

Therefore, image processing device 100 can make printing device 200 print a high-quality image based on first still image data D1 corresponding to the HDR without impairing the brightness range (dynamic range) of first still image data D1 as much as possible.

1-4. Modification of First Exemplary Embodiment

Figure 19:
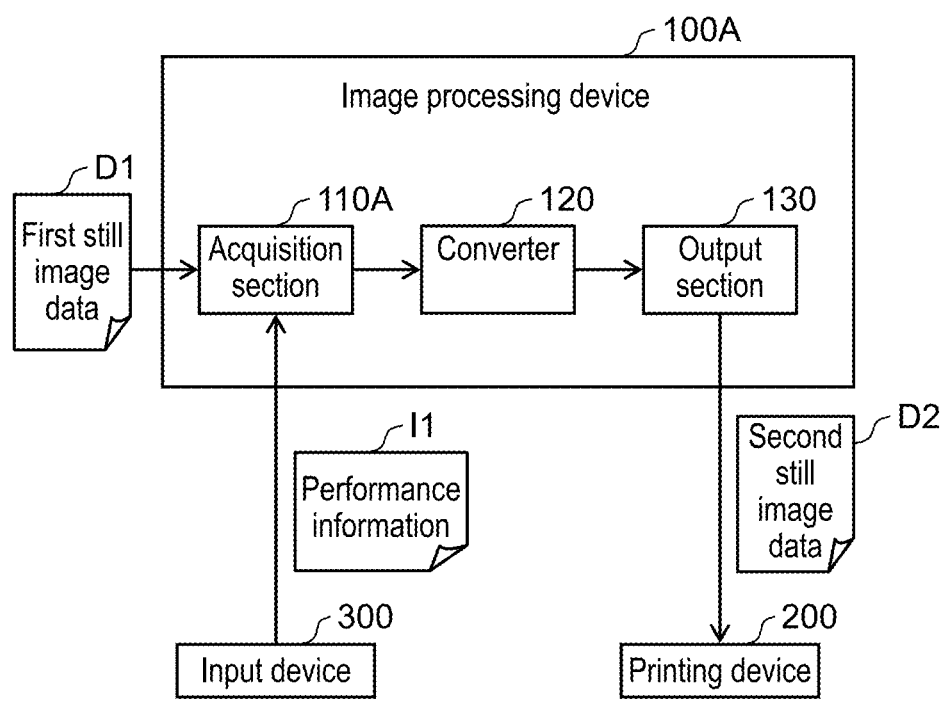
FIG. 19 is a block diagram schematically illustrating an exemplary functional configuration of an image processing device according to a first modification of the first exemplary embodiment.
Figure 20:
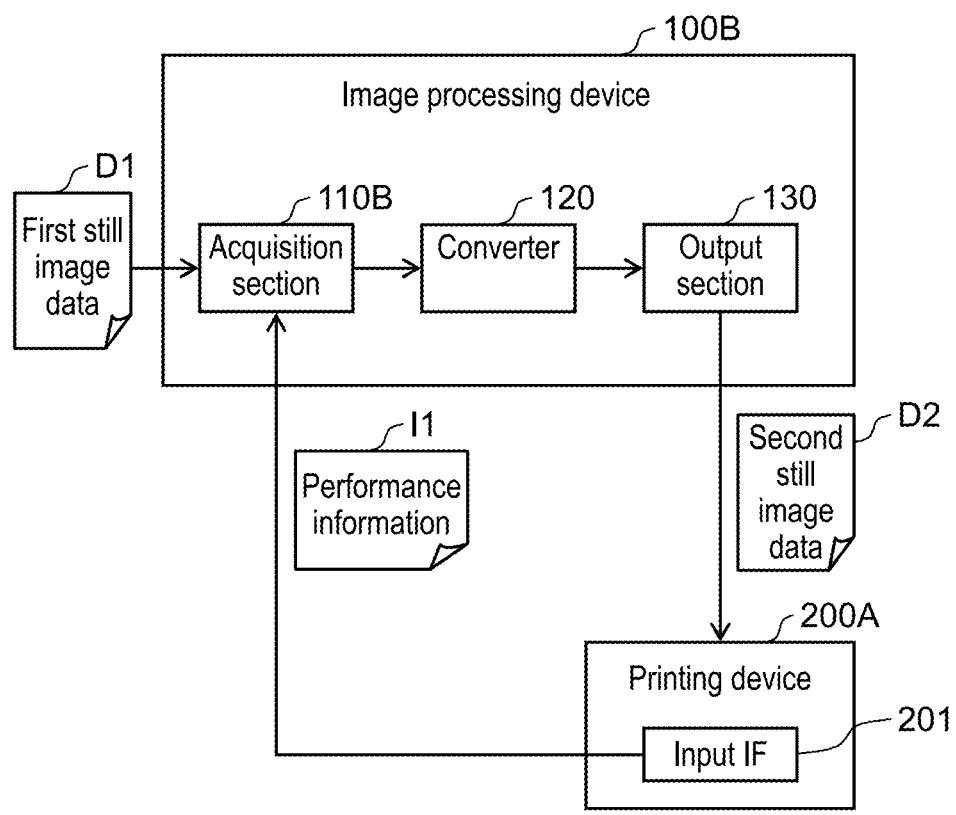
FIG. 20 is a block diagram schematically illustrating an exemplary functional configuration of an image processing device according to a second modification of the first exemplary embodiment.
Figure 21:
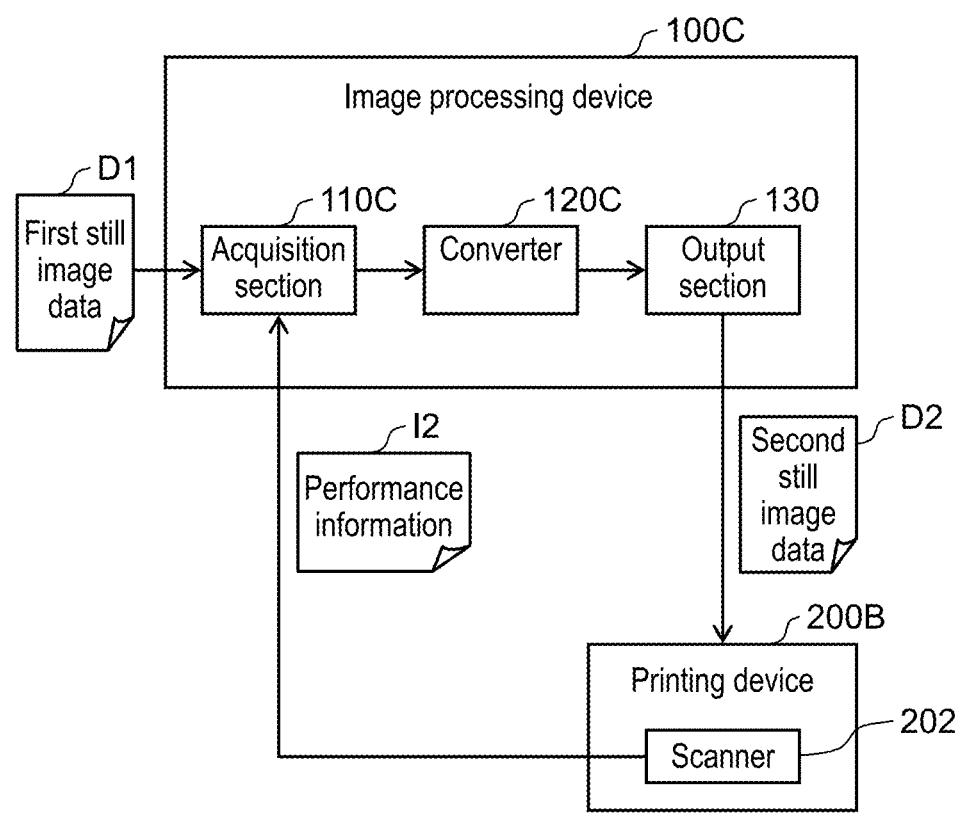
FIG. 21 is a block diagram schematically illustrating an exemplary functional configuration of an image processing device according to a third modification of the first exemplary embodiment.

Referring now to FIG. 19 to FIG. 21, first to fifth modifications of the first exemplary embodiment will be described. Note that the same reference marks as in the first exemplary embodiment denote substantially the same constituent elements in the following description, and a description of the constituent elements will be omitted. In the following description, image processing devices 100A, 100B, and 100C are examples of the image processing device, respectively. Acquisition sections 110A, 110B, and 110C are examples of the acquisition section, respectively. Converter 120C is an example of the converter. Printing devices 200A and 200B are examples of the printing device, respectively.

1-4-1. First Modification

A first modification of the first exemplary embodiment will now be described.

FIG. 19 is a block diagram schematically illustrating an exemplary functional configuration of image processing device 100A according to the first modification of the first exemplary embodiment.

Image processing device 100A includes acquisition section 110A, converter 120, and output section 130. Compared with image processing device 100, image processing device 100A of the first modification is different from image processing device 100 in the first exemplary embodiment in that performance information I1 is acquired from input device 300. Other configurations in image processing device 100A is substantially the same as image processing device 100 in the first exemplary embodiment, and thus detailed description will be omitted.

Acquisition section 110A acquires first still image data D1 and performance information I1 in the same manner as acquisition section 110 in image processing device 100 of the first exemplary embodiment.

Acquisition section 110A may acquire first still image data D1 from the imaging device, an information terminal, a memory device, or the like connected to image processing device 100A via wired connection or wireless connection in the same manner as acquisition section 110 of image processing device 100 in the first exemplary embodiment. Acquisition section 110A that acquires first still image data D1 may be implemented, for example, by communication IF 105 (see FIG. 14).

Acquisition section 110A may acquire performance information I1 from input device 300 connected to image processing device 100A via a wired connection or a wireless connection. Performance information I1 acquired by acquisition section 110A may either be paper information or a printing result in the same manner as the first exemplary embodiment. Acquisition section 110A that acquires performance information I1 may be implemented, for example, by communication IF 105 (see FIG. 14).

Input device 300 is, for example, an information terminal used by a user for outputting a printing command to printing device 200 such as a smartphone, a tablet terminal, or a personal computer. Input device 300 includes an input IF and a communication IF (not illustrated), and is configured to transmit a printing command including paper information input through the input IF to image processing device 100A via the communication IF. The input IF provided on input device 300 may have the similar configuration as input IF 104 (see FIG. 14). The communication IF provided on input device 300 may have any configuration capable of communicating with image processing device 100A such as communication IF 105 (see FIG. 14).

In this manner, image processing device 100A may acquire a printing command including performance information I1 via input device 300 provided externally. Image processing device 100A may acquire the printing result input to input device 300 by a user from input device 300.

1-4-2. Second Modification

A second modification of the first exemplary embodiment will now be described.

FIG. 20 is a block diagram schematically illustrating an exemplary functional configuration of image processing device 100B according to the second modification of the first exemplary embodiment.

Image processing device 100B includes acquisition section 110B, converter 120, and output section 130. Compared with image processing device 100, image processing device 100B of the second modification is different from image processing device 100 in the first exemplary embodiment in that performance information I1 is acquired from printing device 200A. Other configurations in image processing device 100B is substantially the same as image processing device 100 in the first exemplary embodiment, and thus detailed description will be omitted.

Acquisition section 110B acquires first still image data D1 and performance information I1 in the same manner as acquisition section 110 in the first exemplary embodiment and acquisition section 110A in the first modification.

Acquisition section 110B may acquire first still image data D1 from the imaging device, an information terminal, a memory device, or the like connected to image processing device 100B via wired connection or wireless connection in the same manner as acquisition section 110 of image processing device 100 in the first exemplary embodiment. Acquisition section 110B that acquires first still image data D1 may be implemented, for example, by communication IF 105 (see FIG. 14).

Acquisition section 110B may acquire performance information I1 from printing device 200A connected to image processing device 100B via a wired connection or a wireless connection. Performance information I1 acquired by acquisition section 110B may either be paper information or a printing result in the same manner as the first exemplary embodiment and the first modification. Acquisition section 110B that acquires performance information I1 may be implemented, for example, by communication IF 105 (see FIG. 14).

Printing device 200A includes input IF 201 used by a user for inputting a printing command to printing device 200A. When printing device 200A receives a printing command to input IF 201 from a user, printing device 200A transmits the printing command to image processing device 100B via the communication IF provided on printing device 200A (not illustrated). Input IF 201 includes, for example, one or a plurality of a touch panel, an input button, and a display. The communication IF provided on printing device 200A may have any configuration capable of communicating with image processing device 100B, and may have a configuration similar to that of communication IF 105, for example (see FIG. 14).

In this manner, image processing device 100B may acquire a printing command including performance information I1 via printing device 200A. Image processing device 100B may acquire the printing result input to printing device 200A by a user from printing device 200A.

1-4-3. Third Modification

A third modification of the first exemplary embodiment will now be described.

FIG. 21 is a block diagram schematically illustrating an exemplary functional configuration of image processing device 100C according to the third modification of the first exemplary embodiment.

Image processing device 100C includes acquisition section 110C, converter 120C, and output section 130. Compared with image processing device 100B in the second modification, image processing device 100C of the third modification is different from image processing device 100B in the second modification in that performance information I2 different from performance information I1 is acquired from printing device 200B. Image processing device 100C of the third modification is different in processing in converter 120C from the processing performed by converter 120 in the second modification. Other configurations in image processing device 100C is substantially the same as image processing device 100B in the second modification, and thus detailed description will be omitted.

Acquisition section 110C acquires first still image data D1 and performance information I2.

Acquisition section 110C may acquire first still image data D1 from the imaging device, an information terminal, a memory device, or the like connected to image processing device 100C via wired connection or wireless connection in the same manner as acquisition section 110 of image processing device 100 in the first exemplary embodiment. Acquisition section 110C that acquires first still image data D1 may be implemented, for example, by communication IF 105 (see FIG. 14).

Acquisition section 110C acquires performance information I2 from printing device 200B connected to image processing device 100C via a wired connection or a wireless connection. Specifically, acquisition section 110C acquires a scanned image obtained by scanning paper used for printing by printing device 200B (for example, paper before printing with nothing printed) with scanner 202 of printing device 200B as performance information I2. Acquisition section 110C is realized, for example, by communication IF 105 (see FIG. 14).

Converter 120C specifies a highest brightness corresponding to the paper scanned with scanner 202 based on the brightness (reflection brightness) of the scanned image acquired by acquisition section 110C. Converter 120C determines the second dynamic range based on the highest brightness. In other words, converter 120C determines the brightness range (dynamic range) having the highest brightness at the reflection brightness specified based on performance information I2 to be the second dynamic range, and converts data from the first still image data into the second still image data. Converter 120C is implemented, for example, by CPU 101, main memory 102, storage 103 (see FIG. 14) and the like.

Converter 120C may change conversion processing depending on the type of scanner 202. Converter 120C may correct brightness of an acquired image according to, for example, at least one of lightness of a light source provided on scanner 202 and sensitivity of an image sensor provided on scanner 202. Converter 120C may correct the brightness of the image so that the brightness of the acquired image becomes smaller with an increase the lightness of the light source provided on scanner 202. The converter 120C may correct the brightness of the image so that the brightness of the acquired image becomes smaller as the sensitivity of the image sensor provided on scanner 202 increases. In this case, image processing device 100C may store correction information including information indicating the type of scanner 202 and information indicating correction processing for correcting brightness of the image associated in one-to-one correspondence in storage 103. Image processing device 100C may perform the conversion processing according to the type of scanner 202 by acquiring information indicating the type of scanner 202 from printing device 200B, determining correction processing corresponding to the acquired information indicating the type of scanner 202 from the correction information, and preforming the specified correction processing. In this modification, the correction information may not be stored in storage 103. Image processing device 100C may acquire correction information via communication IF 105 (see FIG. 14) from the information processing device provided on the exterior.

Printing device 200B is provided with scanner 202. Printing device 200B can acquire a scanned image by scanning paper used for printing by printing device 200B (for example paper before printing with nothing printed) by scanner 202. Printing device 200B transmits the acquired scanned image to image processing device 100C via the communication IF (not illustrated) provided on printing device 200B as performance information I2.

For example, image processing device 100C may be provided with a display. Image processing device 100C may display a scanning command on the display. The scanning command may be a message, an image, UI, or the like that prompts a user to scan paper used for printing by printing device 200B by scanner 202 provided on printing device 200B connected to image processing device 100C. In this case, image processing device 100C may determine whether or not printing device 200B is provided with scanner 202 through wired communication or wireless communication with printing device 200B connected to image processing device 100C. When the paper is scanned by printing device 200B in response to a user operation after a scanning command prompting a user to scan paper is displayed on the display, and a scanned image of the paper is acquired by the scanning, image processing device 100C may perform control for making printing device 200B transmit the acquired scanned image to image processing device 100C.

As described thus far, in the image processing device of the present modification, the acquisition section may acquire a scanned image acquired by scanning the paper used for printing by the printing device as performance information. Based on the brightness of the scanned image acquired by the acquisition section, the converter may determine the reflection brightness of light radiated on the paper and reflected from the paper, and convert data from first still image data into second still image data with a brightness range having the highest brightness at the specified reflection brightness as a second dynamic range.

Note that performance information I2 is an example of the performance information.

For example, in the example described in the third modification, in image processing device 100C, acquisition section 110C acquires a scanned image acquired by scanning the paper used for printing by printing device 200B as performance information I2. Based on the brightness of the scanned image acquired by acquisition section 110C, converter 120C determines the reflection brightness of light reflected from paper when the paper is irradiated with the light and converts data from first still image data D1 to second still image data D2 with the brightness range having the highest brightness at the specified reflection brightness as the second dynamic range.

Image processing device 100C configured in this manner can acquire a scanned image by scanning paper used for printing by printing device 200B with scanner 202 and determine the second dynamic range according to the acquired scanned image. Image processing device 100C is capable of converting first still image data D1 into second still image data D2 defined in the second dynamic range and outputting second still image data D2 to printing device 200B. In other words, image processing device 100C is capable of estimating the expression ability of paper to be used by printing device 200B for printing (that is, the brightness range having the highest brightness at brightness expressed by white part of the paper) easily and determining the second dynamic range easily by setting the brightness range (dynamic range) adequate for the expression ability of the paper to the second dynamic range. Therefore, image processing device 100C is capable of making printing device 200B print the high-quality image based on first still image data D1.

Note that image processing device 100C may acquire the printing result input to printing device 200B by a user from printing device 200B.

1-4-4. Fourth Modification

A fourth modification of the exemplary embodiment will now be described.

In the description of the first exemplary embodiment (and the first to third modifications of the first exemplary embodiment), image processing device 100 (100A, 100B, or 100C) is configured to be separate and independent configuration from printing device 200 (200A or 200B). However, the present disclosure is not limited to such a configuration at all. For example, printing device 200 may be built in image processing device 100 or image processing device 100A, printing device 200A may be built in image processing device 100B, or printing device 200B may be built in image processing device 100C. In this case, communication IF 105 capable of communicating with printing device 200 (200A or 200B) in image processing device 100 (100A, 100B, or 100C) may be omitted.

1-4-5. Fifth Modification

A fifth modification of the first exemplary embodiment will now be described.

In the first to fourth modifications of the first exemplary embodiment, converter 120 (120C) performing processing for converting first still image data D1 to second still image data D2 has been described. However, the present disclosure is not specifically limited to such a configuration at all.

When the highest brightness of first still image data D1 is smaller than the reflection brightness corresponding to the paper (the reflection brightness specified by the paper information or the reflection brightness acquired from the scanned image), converter 120 (120C) does not have to convert first still image data D1 to second still image data D2.

Figure 22:
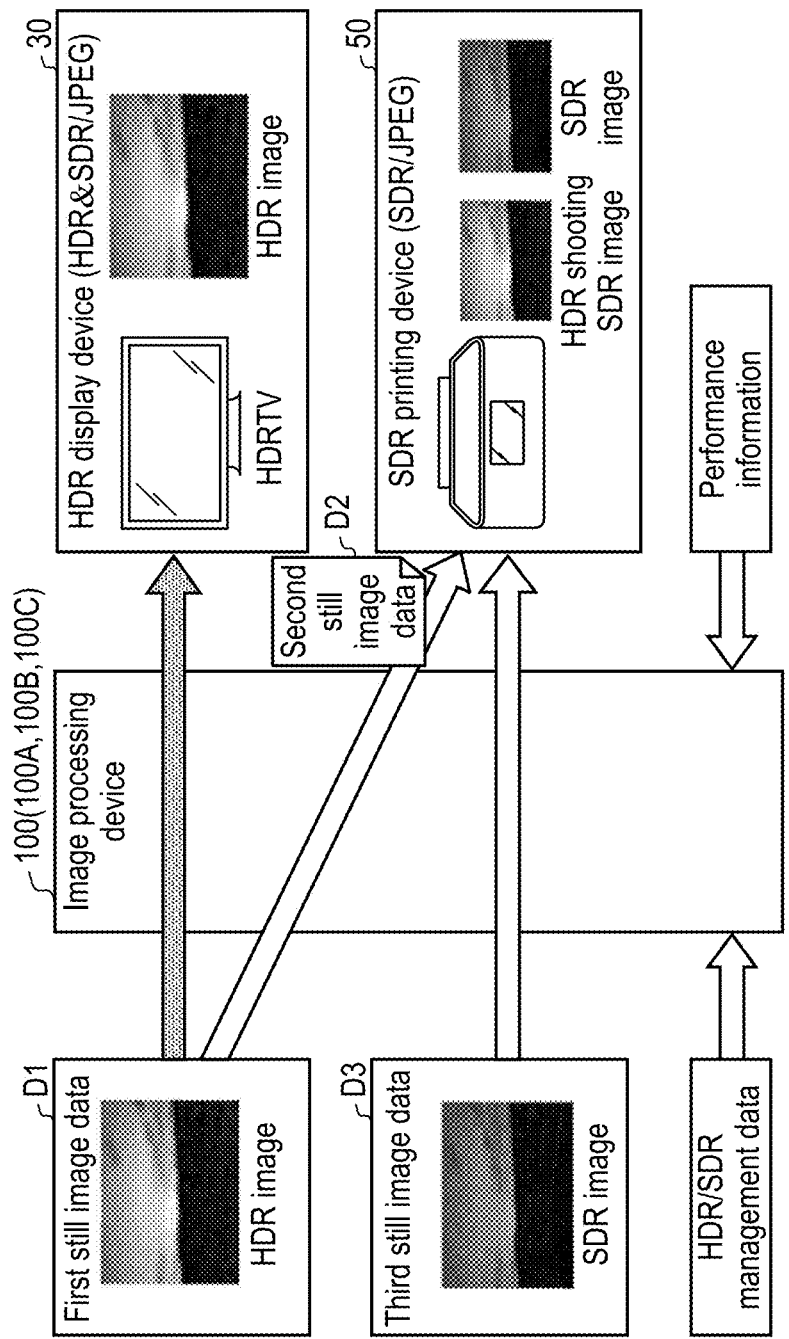
FIG. 22 is a schematic view for explaining an example of the image processing device according to the first exemplary embodiment (or first to fifth modifications).

In this case, acquisition section 110 (110A, 110B, or 110C) acquires first still image data D1 and further acquires third still image data D3 defined with a third dynamic range having a brightness range (dynamic range) smaller than the brightness range of the first dynamic range (see FIG. 22). The third dynamic range is, for example, a Standard Dynamic Range (SDR).

Acquisition section 110 (110A, 110B, or 110C) may acquire third still image data D3 from the imaging device, the information terminal, the memory device, or the like connected to image processing device 100 (100A, 100B, or 100C) via wired connection or wireless connection in the same manner as the case of acquiring first still image data D1. For example, when the imaging device configured to take an image of a subject and generating first still image data D1 (for example, HDR imaging device 10 illustrated in FIG. 9) is capable of generating third still image data D3 together with first still image data D1 as well at the same time as imaging of the subject, acquisition section 110 (110A, 110B, or 110C) can acquire third still image data D3 from the imaging device.

Output section 130 then outputs third still image data D3 acquired by acquisition section 110 (110A, 110B, or 110C) to printing device 200 (200A or 200B).

In other words, in the image processing device of the fifth modification, acquisition section may acquire the first still image data as well as a third still image data defined with the third dynamic range having a brightness range smaller than the brightness range of the first dynamic range. When the highest brightness of the first still image data is smaller than the reflection brightness corresponding to the paper, the converter does not convert data from the first still image data to the second still image data, and the output section may output the third still image data acquired by the acquisition section to the printing device.

Third still image data D3 is an example of the third still image data.

For example, in the example described in the fifth modification, in image processing device 100 (100A, 100B, or 100C), acquisition section 110 (110A, 110B, or 110C) acquires first still image data D1 and further acquires third still image data D3 defined with a third dynamic range having a brightness range smaller than the brightness range of the first dynamic range. When the highest brightness of first still image data D1 is smaller than the reflection brightness corresponding to the paper, converter 120 (120C) does not perform conversion from first still image data D1 to second still image data D2, and output section 130 outputs third still image data D3 acquired by acquisition section 110 (110A, 110B, or 110C) to printing device 200 (200A or 200B).

When the highest brightness of first still image data D1 of HDR is smaller than the reflection brightness corresponding to the paper, image processing device 100 (100A, 100B, or 100C) configured in this manner can output third still image data D3 of the SDR to printing device 200 (200A or 200B) and print the image in third still image data D3 by printing device 200 (200A or 200B).

For example, the highest brightness of first still image data D1 is lower than the reflection brightness corresponding to paper used for printing by printing device 200 (200A or 200B) and thus printing device 200 (200A or 200B) may not be able to print a high-quality image even though conversion processing from first still image data D1 to second still image data D2 is performed. In such a case, image processing device 100 (100A, 100B, or 100C) outputs third still image data D3 of the SDR to printing device 200 (200A or 200B) without performing conversion processing from first still image data D1 to second still image data D2. Therefore, according to the configuration example described in the fifth modification, a burden of the conversion processing in image processing device 100 (100A, 100B, or 100C) can be alleviated.

1-5. Summary

FIG. 22 is a schematic view for explaining an example of image processing device 100 (100A, 100B, or 100C) according to the first exemplary embodiment (or first to fifth modifications).

As illustrated in FIG. 22, image processing device 100 (100A, 100B, or 100C) acquires first still image data D1, being an HDR image, and outputs first still image data D1 directly to HDR display device 30 as-is. HDR display device 30 is adaptive to the HDR, and thus is capable of displaying first still image data D1 at a high quality.

Image processing device 100 (100A, 100B, or 100C) also acquires first still image data D1 and performance information I1 (I2) of SDR printing device 50. Image processing device 100 (100A, 100B, or 100C) converts first still image data D1 to second still image data D2 based on acquired performance information I1 (I2) and outputs converted second still image data D2 to SDR printing device 50. SDR printing device 50 cannot print first still image data D1 as-is. However, since SDR printing device 50 is adapted to second still image data D2 converted from first still image data D1 in image processing device 100 (100A, 100B, or 100C), SDR printing device 50 can print an image based on second still image data D2 on paper by using second still image data D2. In addition, since second still image data D2 is defined in the brightness range (dynamic range) larger than third still image data D3, being the SDR image, an image having a higher quality than SDR image based on third still image data D3 can be printed on paper.

When the highest brightness of first still image data D1 is smaller than the reflection brightness corresponding to the paper, image processing device 100 (100A, 100B, or 100C) does not perform conversion of data from first still image data D1 to second still image data D2, and outputs third still image data D3 to SDR printing device 50. Since SDR printing device 50 is adaptive to third still image data D3, being a SDR image, an image based on third still image data D3 can be printed as-is.

1-6. Example of Communication Protocol

Referring now to FIG. 23 to FIG. 26, examples (first example to fourth example) of a communication protocol in the exemplary embodiment will be described. In the following description, substantially the same constituent elements are designated by the same reference marks and overlapped description will be omitted.

Figure 23:
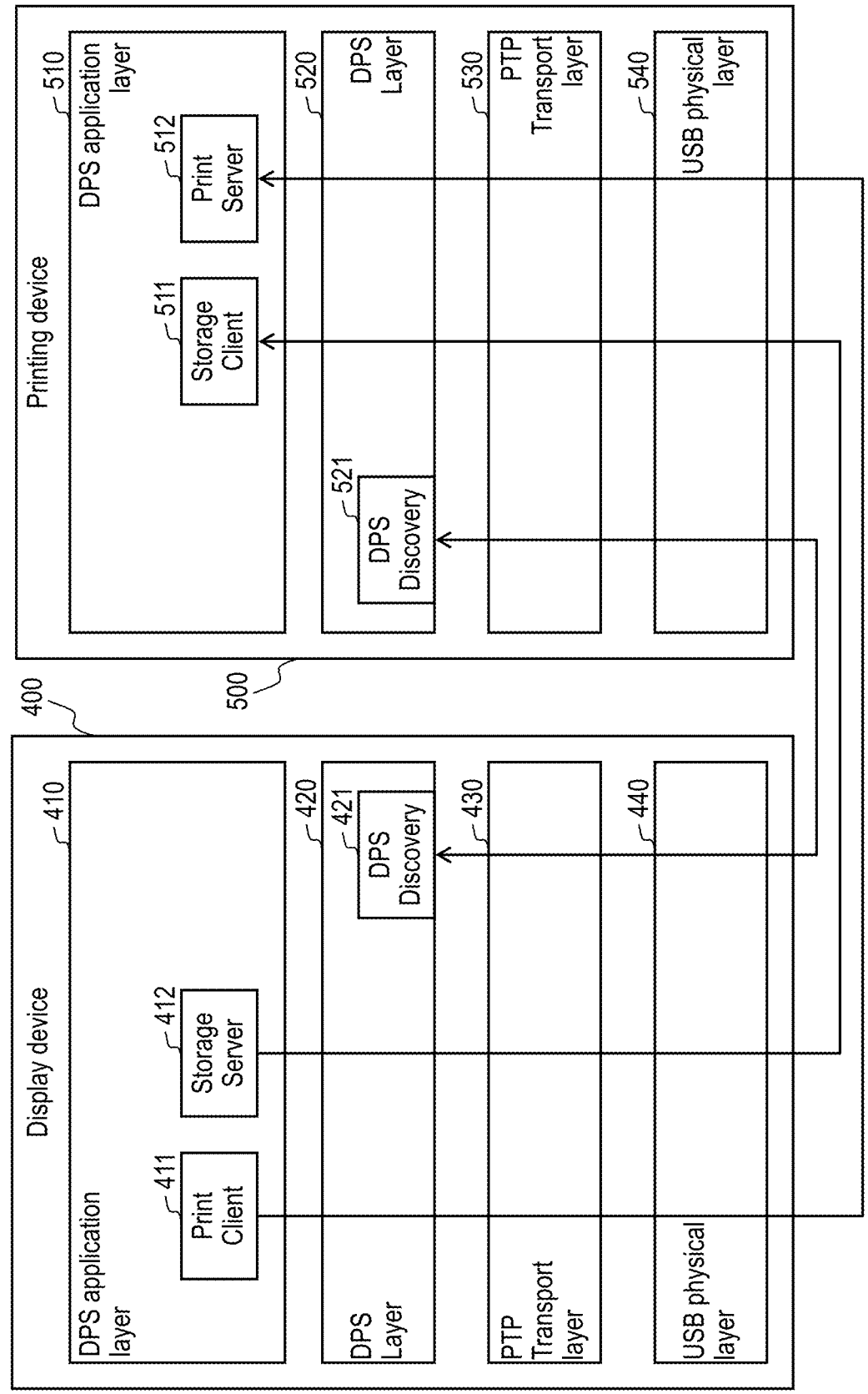
FIG. 23 is a drawing schematically illustrating a first example of a communication protocol between a display device and a printing device according to an exemplary embodiment.

FIG. 23 is a drawing schematically illustrating a first example of a communication protocol between display device 400 and printing device 500 according to an exemplary embodiment.

Display device 400 is a device having an image display function or an image reproducing function such as television sets, video recorders, video players, or digital cameras. Printing device 500 is a device having a printing function such as a printer.

A communication protocol of display device 400 includes, from the bottom in sequence, USB physical layer 440 as a physical layer, PTP Transport layer 430 as a transport layer, DPS Layer 420 as a conversion layer, and DPS application layer 410 as an application layer. A communication protocol of printing device 500 includes, from the bottom in sequence, USB physical layer 540 as a physical layer, PTP Transport layer 530 as a transport layer, DPS Layer 520 as a conversion layer, and DPS application layer 510 as an application layer. In an example in FIG. 23, USB physical layers 440 and 540 are used as physical layers, and display device 400 and printing device 500 are connected via a USB. However, display device 400 and printing device 500 may be connected via wireless communication (for example, Wi-Fi).

FIG. 23 illustrates a configuration example using Picture Transfer Protocol (PTP), being a transport layer and specified as ISO15740. The conversion layer specifies an Interface (I/F) for an application layer and converts an input and an output from the application layer into a PTP protocol. A DPS layer includes a DPS Discovery configured to negotiate whether display device 400 and printing device 500 have any function corresponding to each other. DPS layer 420 includes DPS Discovery 421, and DPS Layer 520 includes DPS Discovery 521.

To connect display device 400 and printing device 500 with each other with a USB, mutual connection is established according to PTP first at an opportunity of connection of the USB cable to display device 400 and printing device 500, and then display device 400 and printing device 500 confirm counterparts of connection by DPS discoveries 421, 521. Subsequently, display device 400 that retains a still image to be printed as Storage Server 412 provides a file to printing device 500 as Storage Client 511. Printing device 500 as Print Server 512 accepts a request from display device 400 as Print Client 411. Display device 400 as Print Client 411 sends inquiries asking a printer performance to Print Server 512 and displays the result of inquiries as needed on User Interface (UI) of display device 400.

When a list of still images is displayed on display device 400 and a printing command is issued by a user to display device 400 by selecting a still image to be printed from the display, display device 400 issues a request for printing the selected still image to Print Server 512. Printing device 500 as Storage Client 511 issues a request for a file corresponding to the still image selected for printing to Storage Server 412 of display device 400. Display device 400 notifies printing device 500 of the still image to be held as a file depending on the request.

Figure 24:
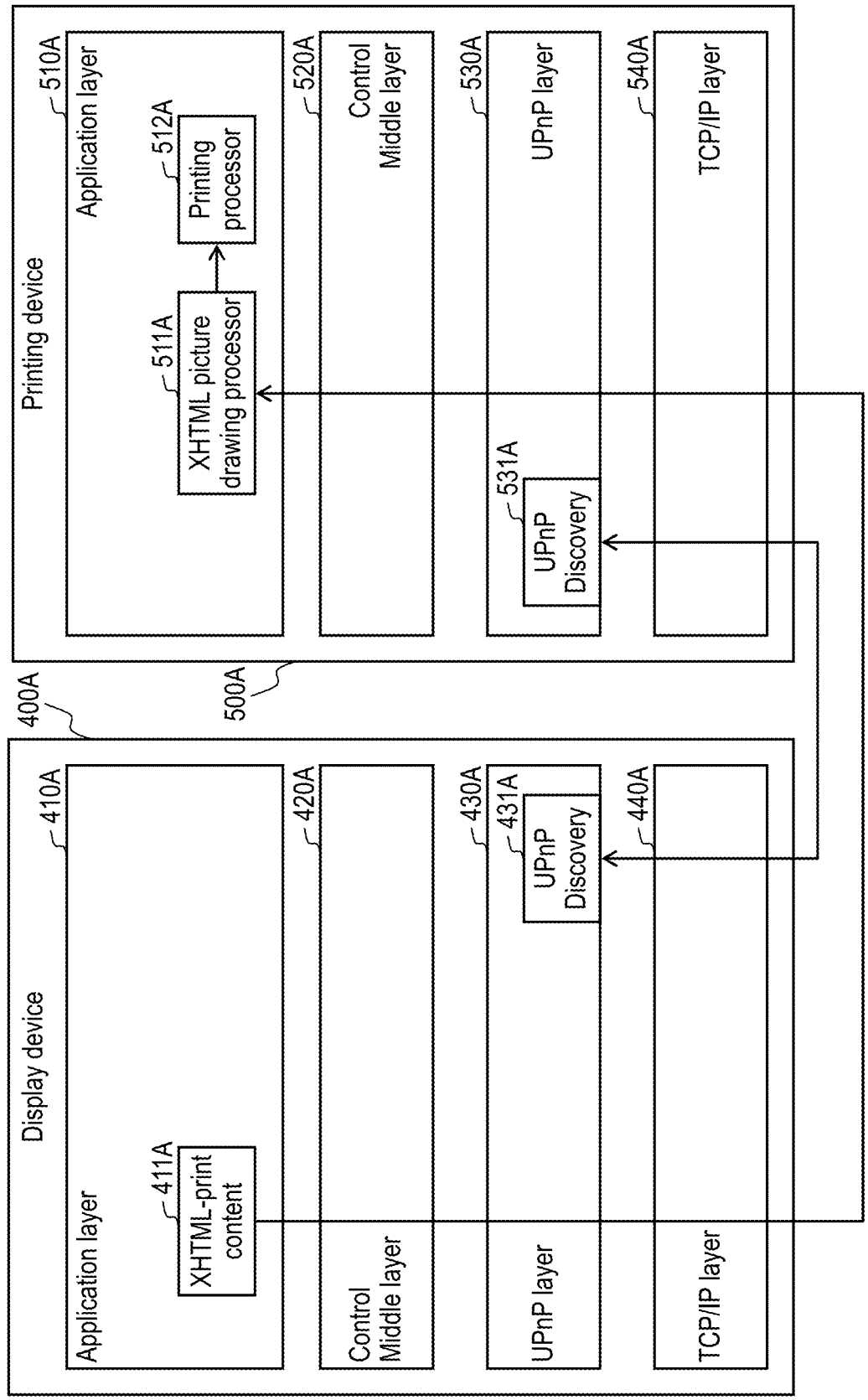
FIG. 24 is a drawing schematically illustrating a second example of the communication protocol between the display device and the printing device in the exemplary embodiment.

FIG. 24 is a drawing schematically illustrating a second example of a communication protocol between display device 400A and printing device 500A according to an exemplary embodiment.

Display device 400A is a device having an image display function or an image reproducing function such as television sets, video recorders, video players, or digital cameras in the same manner as the first example. Printing device 500A is a device having a printing function such as a printer in the same manner as the first example.

A communication protocol of display device 400A includes, from the bottom in sequence, TCP/IP layer 440A, UPnP layer 430A, Control Middle layer 420A, and an application layer 410A. A communication protocol of printing device 500A includes, from the bottom in sequence, TCP/IP layer 540A, UPnP layer 530A, Control Middle layer 520A, and an application layer 510A.

A communication protocol of display device 400A and printing device 500A uses a Wi-Fi as a physical layer (not illustrated) and employs TCP/IP layer 440A, 540A as a transport layer above the Wi-Fi. Display device 400A and printing device 500A use UPnP as a protocol for finding counterparts of connection on TCP/IP layer 440A, 540. After display device 400A and printing device 500A recognize counterparts with each other by the functions of UPnP layers 430A, 530A, actual printing data are exchanged between display device 400A and printing device 500A with an aid of Control Middle layers 420A, 520A. Note that each printer has its own print command different depending on the type, and Personal Computer (PC) absorbs any difference in printing command from one printing job to another by a driver. Unlike such a PC, creating a mechanism to install a driver is difficult for display device 400A such as a television set and a video recorder. Therefore, display device 400A may employ a universal description language for printing.

Examples of such a language include XHTML-print specified in W3C. In printing using XHTML-print, display device 400A creates a printing command based on XHTML-print content 411A, and sends the created printing command to printing device 500A. Based on the printing command described in XHTML-print, printing device 500A performs layout and rasterize processing of image file or text string in XHTML picture drawing processor 511A to create data for actual printing. Print processor 512A prints data acquired in this manner.

Figure 25:
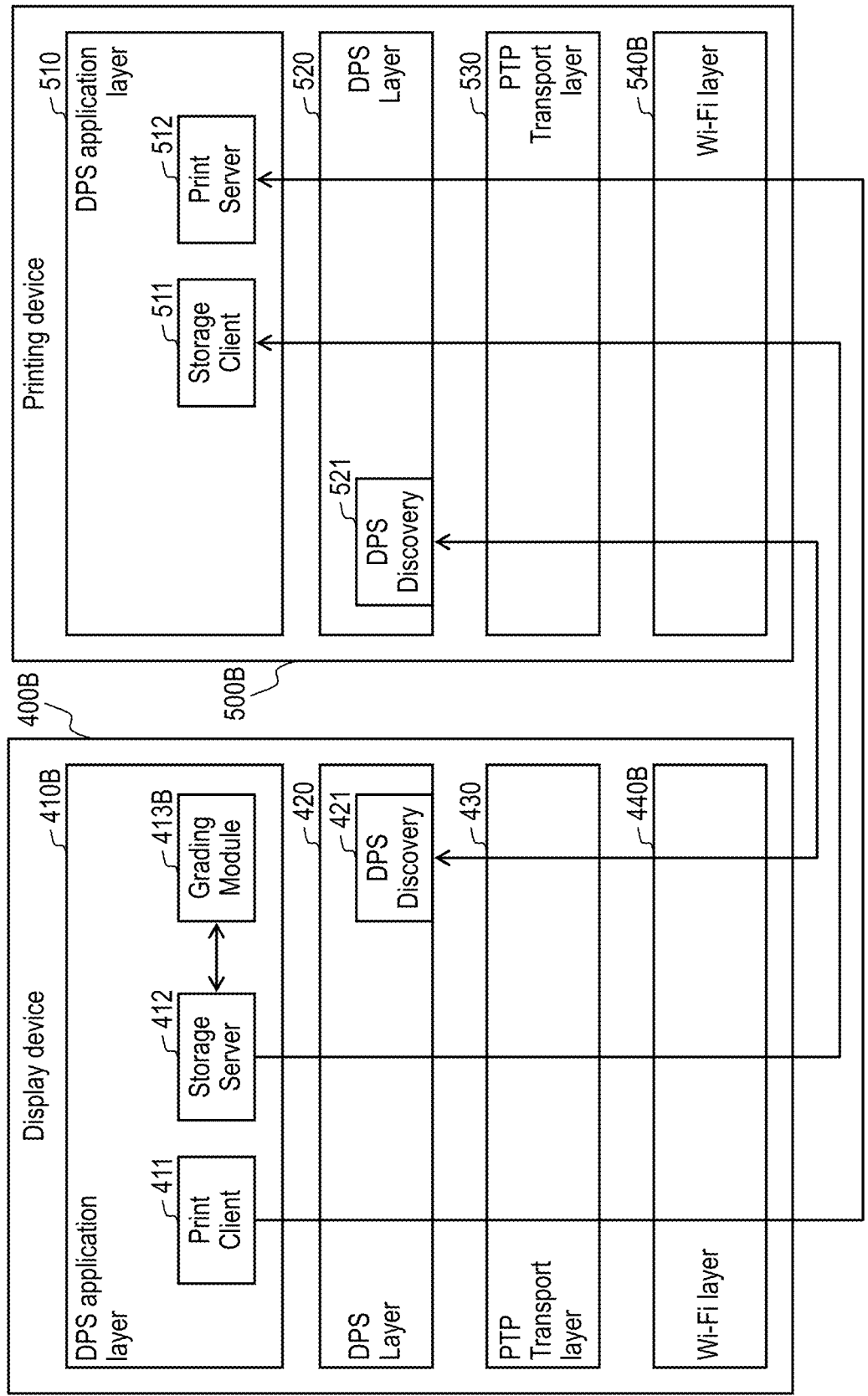
FIG. 25 is a drawing schematically illustrating a third example of the communication protocol between the display device and the printing device in the exemplary embodiment.

FIG. 25 is a drawing illustrating a third example of a communication protocol between display device 400B and printing device 500B according to an exemplary embodiment.

Display device 400B is a device having an image display function or an image reproducing function such as television sets, video recorders, video players, or digital cameras in the same manner as the first example and the second example. Printing device 500B is also a device having a printing function such as a printer in the same manner as the first example and the second example. Note that printing device 500B is a device adaptive only to SDR and nonadaptive to HDR when first still image data D1 is printed.

The communication protocol of display device 400B includes, from the bottom in sequence, Wi-Fi layer 440B, PTP transport layer 430B, DPS Layer 420, and DPS application layer 410B. The communication protocol of printing device 500B includes, from the bottom in sequence, Wi-Fi layer 540B, PTP transport layer 530, DPS Layer 520, and DPS application layer 510.

The communication protocol between display device 400B and printing device 500B described in the third example is based on communication protocol using PTP described in the first example. Print Client 411 of display device 400B figures out functions of printing device 500B as a counterpart of connection through communication with Print Server 512 of printing device 500B.

For example, when printing device 500B is a device adaptive only to SDR still image data such as 8 bits JPG, display device 400B cannot send HDR still image data held in display device 400B to printing device 500B as-is. In such a case, display device 400B adjusts HDR still image data held in display device 400B to the function of printing device 500B by using Grading Module 413B and creates an 8 bits JPG file. In other words, display device 400B creates an 8 bits JPG file from the HDR still image data adaptive to the function of printing device 500B.

Display device 400B provides printing device 500B with an 8 bits JPG file acquired from HDR still image data in response to a request from Storage Client 511 of printing device 500B. In other words, display device 400B described in the third example includes any one of image processing devices 100, 100A to 100C described in first exemplary embodiment and the first to the fifth modifications.

In the description of the above-described example, a configuration of display device 400B creating still image data of 8 bits JPG file adaptive to printing device 500B has been described. However, the present disclosure is not limited to such a configuration. Display device 400B may create an 8 bits JPG file adaptive to the HDR still image file in advance. For example, in order to support the printing device adaptive only to an 8 bits JPG file, the digital camera is preferably configured to create image obtained through imaging in both formats, first still image data D1 adaptive to HDR and an 8 bits JPG file (for example, third still image data D3).

However, unlike display device 400B specific to standard display environment such as sRGB and BT.709, printing quality of printing device 500B may vary depending on the type of paper and ink used for printing. Therefore, display device 400B may often be preferred to change the method of grading for creating an 8 bits JPG file from an HDR still image file depending on setting or performance of printing device 500B. Therefore, display device 400B may create an 8 bits JPG file each time depending on setting or performance of printing device 500B.

Note that printing device 500B may be printing device 200 (200A or 200B).

FIG. 26 is a drawing schematically illustrating a fourth example of a communication protocol between display device 400C and a printing device 500C according to an exemplary embodiment.

In the fourth example, display device 400C is a device having an image display function or an image reproducing function such as television sets, video recorders, video players, or digital cameras in the same manner as the third example. Printing device 500C is a device having a printing function as a printer in the same manner as in the third example, and is a device adaptive only to SDR but nonadaptive to HDR for printing first still image data D1.

The communication protocol of display device 400C includes, from the bottom in sequence, Wi-Fi layer 440B, PTP transport layer 430B, DPS Layer 420, and DPS application layer 410. The communication protocol of printing device 500C includes, from the bottom in sequence, Wi-Fi layer 540B, PTP transport layer 530, DPS Layer 520, and DPS application layer 510C.

Communication protocol between display device 400C and printing device 500C described in the fourth example is different from the configuration described in the third example in that processing performed by Grading Module 413B of display device 400B in the third example is performed by Grading Module 513C of printing device 500C. In other words, printing device 500C described in the fourth example has a configuration including any one of image processing devices 100, 100A to 100C described in any one of the first exemplary embodiment and the first to the fifth modifications.

Storage Server 412 of display device 400C provides the HDR still image data to printing device 500C as-is in response to a request from Storage Client 511 of printing device 500C. In printing device 500C, Grading Module 513C adequately executes grading to the received HDR still image data depending on the type of paper and ink used in printing device 500C, setting relating to the print quality and the like, and prints the still image using the graded data.

Note that printing device 500C may be printing device 200 (200A or 200B).

Other Exemplary Embodiment

The first exemplary embodiment and the first to the fifth modifications have been described above as illustrations of the technique disclosed in the present application. However, the technique in the present disclosure is not limited to these exemplary embodiments, and is also applicable to exemplary embodiments subjected to changes, replacements, additions, omissions, or the like. In addition, a new exemplary embodiment can be made by combining the constituent elements described in the above first exemplary embodiment and the first to the fifth modifications.

Accordingly, other exemplary embodiments are described below.

Absolute brightness values are used for the brightness information used in first still image data D1 in the description given above. However, when second still image data D2 is created, brightness calculated from the stop number of each of light portion and dark portion of a picture obtained through imaging may be used instead of the absolute brightness value. In other words, converter 120 (120C) may convert first still image data D1 to second still image data D2 by using the relative brightness without using the absolute brightness of first still image data D1.

In the exemplary embodiments, the printing performance has been described as a performance expressed by a reflectance ratio or the like specifically of the paper. However, the printing performance may be addition characteristics added with printing characteristics of the printing device. In other words, characteristics of ink of the printing device, characteristics of discharge of ink and the like may be taken into account for the printing performance. First still image data D1 may be converted into second still image data D2 by taking the first dynamic range of first still image data D1, the paper type, the type and lightness of light source, and the brightness range (dynamic range) that can be expressed by characteristics of ink into account.

Instead of performing the conversion processing of signal by converter 120, the amount of discharge of ink of the printing device may be controlled to achieve the equivalent effects as the signal conversion processing. In other words, instead of generating second still image data D2, the amount of discharge of ink of the printing device may be controlled to achieve output of printing matter equivalent to the case of printing second still image data D2.

Each of the constituent elements in the first exemplary embodiment and the first to the fifth modifications may be configured with dedicated hardware (for example, electronic circuits including semiconductor integrated circuits) or implemented by a software program suitable for each constituent element using a processor. A program executor such as a central processing unit (CPU) and a processor reads and executes a software program recorded in a recording medium such as a hard disk and a semiconductor memory, whereby each constituent element may be implemented.

In the exemplary embodiments, how functional blocks are divided in each of the block diagrams is merely an example. For example, a plurality of functional blocks may be implemented as one functional block, one functional block may be divided into a plurality of functional blocks, or a part of the functions may be transferred to another functional block. Further, functions of a plurality of functional blocks may be processed in parallel or in a time-sharing manner by single piece of hardware or software. Part of the function of a plurality of the functional block may be implemented by hardware and remaining functions may be implemented by software.

Furthermore, an execution order of each step in the flowcharts illustrated in the drawings in the exemplary embodiments is only an exemplary order. Each step may be executed in order different from the orders described in the exemplary embodiments. Furthermore, some of the above steps may be executed simultaneously (in parallel) with the other steps.

Software implementing the image processing methods of the exemplary embodiments is as follows.

In other words, the program causes a computer to execute an image processing method including: acquiring first still image data obtained through imaging and having a brightness range defined in a first dynamic range and performance information indicating a printing performance of a printing device; converting the first still image data acquired to second still image data defined in a second dynamic range having a smaller brightness range than the first dynamic range depending on the printing performance indicated by the performance information acquired; and outputting the second still image data converted to the printing device.

The image processing method, the computer program that causes a computer to perform the image processing method, and computer-readable recording medium in which the program is recorded are included in the scope of the present disclosure. Examples of such computer-readable recording media include: flexible disks; hard disks; compact disk read-only memories (CD-ROMs); magneto-optical disks (MOs); digital versatile disks (DVDs); DVD-ROMs; DVD-RAMs; Blu-ray (registered trademark) discs (BDs); and semiconductor memories. The computer program is not limited to computer programs recorded in the recording medium mentioned above, but may be transmitted through, for example, an electrical communication line, a wireless or wired communication line, or a network such as the Internet.

A part or all of the constituent elements constituting the above-described devices may be configured with an integrated circuit (IC) card detachable from each of the devices, or a single module.

A part or all of the constituent elements constituting the above devices may be configured with a single Large Scale Integration (LSI).

Each processor is not limited to LSI or IC, but may be configured with a dedicated circuit or a general-purpose processor. Alternatively, each processor may be constructed with a field programmable gate array (FPGA) in which a circuit configuration can be programmed or a reconfigurable processor that can reconfigure connection and setting of circuit cells in the LSI.

The program may be distributed while recorded in a recording medium. For example, the distributed program is installed in the device, and the processor of the device is cause to execute the program, which allows the device to perform various pieces of processing.

The computer program or the digital signal of the present disclosure may be transmitted through an electrical communication line, a wireless or wired communication line, a network such as the Internet, and data broadcasting.

The present disclosure may be achieved on another independent computer system by the program or digital signals being recorded in a recording medium and being transported, or by the program or digital signals being transferred over the network or the like.

In the exemplary embodiments, each piece of processing (each function) may be implemented by centralized processing performed by a single device (system) or distributed processing performed by a plurality of devices.

The exemplary embodiments have been described as examples of the technique in the present disclosure. The accompanying drawings and the detailed description have been provided for this purpose.

Accordingly, the constituent elements described in the accompanying drawings and the detailed description may not only include constituent elements that are essential for solving the problems, but may also include constituent elements that are not essential for solving the problems in order to illustrate the technique. It should not be therefore determined that the unessential constituent elements in the accompanying drawings and the detailed description are essential only based on the fact that these constituent elements are included in the drawings and the description.

The above exemplary embodiments are provided to exemplify the technique according to the present disclosure, and thus various changes, replacements, additions, omissions, and the like can be made within the scope of the claims and equivalents thereof.

INDUSTRIAL APPLICABILITY

The present disclosure is applicable to an image processing device and an image processing method that provide still image data for printing high-quality printed matter. Specifically, the present disclosure is applicable to video display devices such as television sets or displays, video reproduction devices such as video recorders or video players, imaging device such as digital cameras or video cameras, terminal devices such as smartphones or tablet computer, printing devices such as printers, or computer device such as PCs or servers.

REFERENCE MARKS IN THE DRAWINGS 1, 2, 3, 4, 5, 6: pattern
10, 10A: HDR imaging device
11: HDR imaging section
12: converter
13: JPEG compressor
14: SDR imaging section
15: HDR image corrector
16: HEVC compressor
20: SDR imaging device
21: SDR imaging section
22: JPEG compressor
30: HDR display device
40: SDR display device
50: SDR printing device
100, 100A, 100B, 100C: image processing device
101: CPU
102: main memory
103: storage
104: input IF
105: communication IF
110, 110A, 110B, 110C: acquisition section
120, 120C: converter
130: output section
150: test pattern
200, 200A, 200B: printing device
201: input IF
202: scanner
300: input device
400, 400A, 400B, 400C: display device
410, 410B, 510, 510C: DPS application layer
410A, 510A: application layer
411: Print Client
411A: XHTML-print contents
412: Storage Server
413B, 513C: Grading Module
420, 520: DPS Layer
420A, 520A: Control Middle layer
421, 521: DPS Discovery
430, 530: PTP Transport layer
430A, 530A: UPnP layer
431A, 531A: UPnP Discovery
440, 540: USB physical layer
440A, 540A: TCP/IP layer
440B, 540B: Wi-Fi layer
500, 500A, 500B, 500C: printing device
511: Storage Client
512: Print Server
511A: XHTML picture drawing processor
512A: printing processor
D1: first still image data
D2: second still image data
D3: third still image data
I1, I2: performance information
P1: paper

The invention claimed is:

1. An image processing device comprising:
an acquisition section configured to acquire first still image data and paper information indicating a paper type used for printing by a printing device, the first still image data being obtained through imaging and having a brightness range defined in a first dynamic range;
a converter configured to convert the first still image data acquired by the acquisition section into second still image data, the second still image data being defined in a second dynamic range having a smaller brightness range than the brightness range of the first dynamic range, the second dynamic range having a highest brightness at a reflection brightness corresponding to the paper type indicated by the paper information acquired by the acquisition section, the reflection brightness being specified by referring to a relationship between a plurality of paper types and a reflection brightness of light reflected from the paper when the paper is irradiated with the light; and
an output section configured to output the second still image data converted by the converter to the printing device.

2. The image processing device according to claim 1, wherein
the acquisition section acquires the first still image data as well as a third still image data defined in a third dynamic range having a brightness range smaller than the brightness range of the first dynamic range, and
when a highest brightness of the first still image data is smaller than the reflection brightness corresponding to the paper, the converter does not convert data from the first still image data into the second still image data, and the output section outputs the third still image data acquired by the acquisition section to the printing device.

3. The image processing device according to claim 1, wherein the image processing device further comprises the printing device.

4. An image processing device comprising:
an acquisition section configured to acquire first still image data and a scanned image, the first still image data being obtained through imaging and having a brightness range defined in a first dynamic range, the scanned image being obtained by scanning paper used for printing by a printing device;
a converter configured to convert the first still image data acquired by the acquisition section into second still image data, the second still image data being defined in a second dynamic range having a smaller brightness range than the brightness range of the first dynamic range, the second dynamic range having a highest brightness at a reflection brightness, the reflection brightness being specified, based on a brightness of the scanned image, as a reflection brightness of light reflected from the paper when the paper is irradiated with the light; and
an output section configured to output the second still image data converted by the converter to the printing device.

5. The image processing device according to claim 4, wherein
the acquisition section acquires the first still image data as well as a third still image data defined in a third dynamic range having a brightness range smaller than the brightness range of the first dynamic range, and
when a highest brightness of the first still image data is smaller than the reflection brightness corresponding to the paper, the converter does not convert data from the first still image data into the second still image data, and the output section outputs the third still image data acquired by the acquisition section to the printing device.

6. The image processing device according to claim 4, wherein the image processing device further comprises the printing device.

7. An image processing device comprising:
an acquisition section configured to acquire first still image data and a printed result, the first still image data being obtained through imaging and having a brightness range defined in a first dynamic range, the printed result being obtained by printing a specific pattern on paper used for printing by the printing device;
a converter configured to convert the first still image data acquired by the acquisition section into second still image data, the second still image data being defined in a second dynamic range having a brightness range, the brightness range being determined according to the printed result acquired by the acquisition section and being smaller than the brightness range of the first dynamic range; and
an output section configured to output the second still image data converted by the converter to the printing device.

8. The image processing device according to claim 7, wherein
the acquisition section acquires the first still image data as well as a third still image data defined in a third dynamic range having a brightness range smaller than the brightness range of the first dynamic range, and
when a highest brightness of the first still image data is smaller than the reflection brightness corresponding to the paper, the converter does not convert data from the first still image data into the second still image data, and the output section outputs the third still image data acquired by the acquisition section to the printing device.

9. The image processing device according to claim 7, wherein the image processing device further comprises the printing device.

10. An image processing method comprising:
acquiring first still image data, the first still image data being obtained through imaging and having a brightness range defined in a first dynamic range;
acquiring paper information indicating a paper type used for printing by a printing device,
converting the first still image data acquired into second still image data, the second still image data being defined in a second dynamic range having a smaller brightness range than the brightness range of the first dynamic range, the second dynamic range having a highest brightness at a reflection brightness corresponding to the paper type indicated by the paper information acquired by the acquisition section, the reflection brightness being specified by referring to a relationship between a plurality of paper types and a reflection brightness of light reflected from the paper when the paper is irradiated with the light; and
outputting the second still image data converted to the printing device.

11. A non-transitory computer-readable recording medium storing a program to be executed by a computer for performing the image processing method according to claim 10.

* * * * *